US011986372B2

(12) United States Patent
Castle et al.

(10) Patent No.: US 11,986,372 B2
(45) Date of Patent: May 21, 2024

(54) DENTAL SURGERY METHOD

(71) Applicant: Castle Wall Pty Ltd, Aspley (AU)

(72) Inventors: Cameron Glenn Castle, Bundaberg Central (AU); Glenn Alan Castle, The Gap (AU)

(73) Assignee: CASTLE WALL PTY LTD, Aspley (AU)

( * ) Notice: Subject to any disclaimer, the term of this patent is extended or adjusted under 35 U.S.C. 154(b) by 524 days.

(21) Appl. No.: 16/968,976

(22) PCT Filed: Jun. 29, 2018

(86) PCT No.: PCT/AU2018/050672

§ 371 (c)(1),
(2) Date: Aug. 11, 2020

(87) PCT Pub. No.: WO2019/157550

PCT Pub. Date: Aug. 22, 2019

(65) Prior Publication Data

US 2021/0052354 A1 Feb. 25, 2021

(30) Foreign Application Priority Data

Feb. 13, 2018 (AU) ................................ 2018201058
May 15, 2018 (AU) ................................ 2018901687

(51) Int. Cl.
*A61C 8/00* (2006.01)
*A61C 3/02* (2006.01)
*A61C 3/14* (2006.01)

(52) U.S. Cl.
CPC .................. *A61C 8/00* (2013.01); *A61C 3/02* (2013.01); *A61C 3/14* (2013.01)

(58) Field of Classification Search
CPC ................ A61C 8/00; A61C 3/02; A61C 3/14
(Continued)

(56) References Cited

U.S. PATENT DOCUMENTS 277,943 A * 5/1883 Richmond ............... A61C 5/50 606/174
2,711,021 A 6/1955 Parker
(Continued)

FOREIGN PATENT DOCUMENTS

CN 107582189 1/2018
EP 318709 11/1988
(Continued)

OTHER PUBLICATIONS

Ando, "WO_2015059761_A1_I_translated" (Year: 2015).*
(Continued)

*Primary Examiner* — Heidi M Eide
*Assistant Examiner* — Holly T. To
(74) *Attorney, Agent, or Firm* — Allen, Dyer, Doppelt + Gilchrist, PA

(57) ABSTRACT

A method for preserving the alveolar ridge using partial extraction therapy. The method comprises de-coronating the tooth to leave a tooth root, de-coring a coronal portion of the tooth root to leave a tooth ring, severing an apical root portion of the tooth root from the tooth ring and removing the apical root portion. The tooth ring provides a ring of natural material that reinforces the coronal part of the tooth socket in the gum and reduces or obviates alveolar resorption.

20 Claims, 29 Drawing Sheets

(58) Field of Classification Search
USPC .......................................................... 433/173
See application file for complete search history.

(56) References Cited

U.S. PATENT DOCUMENTS

| | | | | |
|---|---|---|---|---|
| 4,443,196 | A * | 4/1984 | Rico | A61C 3/14 433/158 |
| 4,854,871 | A * | 8/1989 | Weissman | A61C 13/30 433/166 |
| 2007/0218423 | A1* | 9/2007 | Sapian | A61C 3/14 433/152 |
| 2009/0098509 | A1* | 4/2009 | Weathers | A61C 3/14 433/152 |
| 2012/0135379 | A1* | 5/2012 | Um | A61F 2/4644 433/201.1 |
| 2013/0189646 | A1 | 7/2013 | Hochman et al. | |
| 2014/0065573 | A1* | 3/2014 | Wang | A61B 17/1673 433/166 |
| 2015/0004563 | A1* | 1/2015 | Blaisdell | A61C 8/0001 433/173 |
| 2015/0024346 | A1* | 1/2015 | Johnson | A61C 5/46 433/215 |
| 2015/0118647 | A1* | 4/2015 | Skvirsky | A61C 8/0057 433/173 |
| 2015/0164620 | A1* | 6/2015 | Berger | A61C 8/0048 433/173 |
| 2018/0132976 | A1* | 5/2018 | Hwang | A61B 6/032 |
| 2019/0142552 | A1* | 5/2019 | Zhang | A61C 8/008 433/173 |
| 2020/0197130 | A1* | 6/2020 | Castle | A61C 3/14 |

FOREIGN PATENT DOCUMENTS

| | | | | |
|---|---|---|---|---|
| FR | 3017531 | A1 * | 8/2015 | A61C 8/0004 |
| WO | WO-2008097237 | A1 * | 8/2008 | A61C 1/145 |
| WO | WO 2015/059761 | | 4/2015 | |
| WO | WO-2015059761 | A1 * | 4/2015 | A61C 13/30 |

OTHER PUBLICATIONS

Sauver, "FR_3017531_A1_translated" (Year: 2015).*
"The socket-shield technique: a proof-of-principle report" Journal of clinical periodontology; 37(9), 2010, pp. 855-862.
Sahebi et al. "The effects of short-term calcium hydroxide application on the strength of dentine" Dental Traumatology; 26(1), 2010, pp. 43-46. Abstract Only.

* cited by examiner

FIG. 1A.1

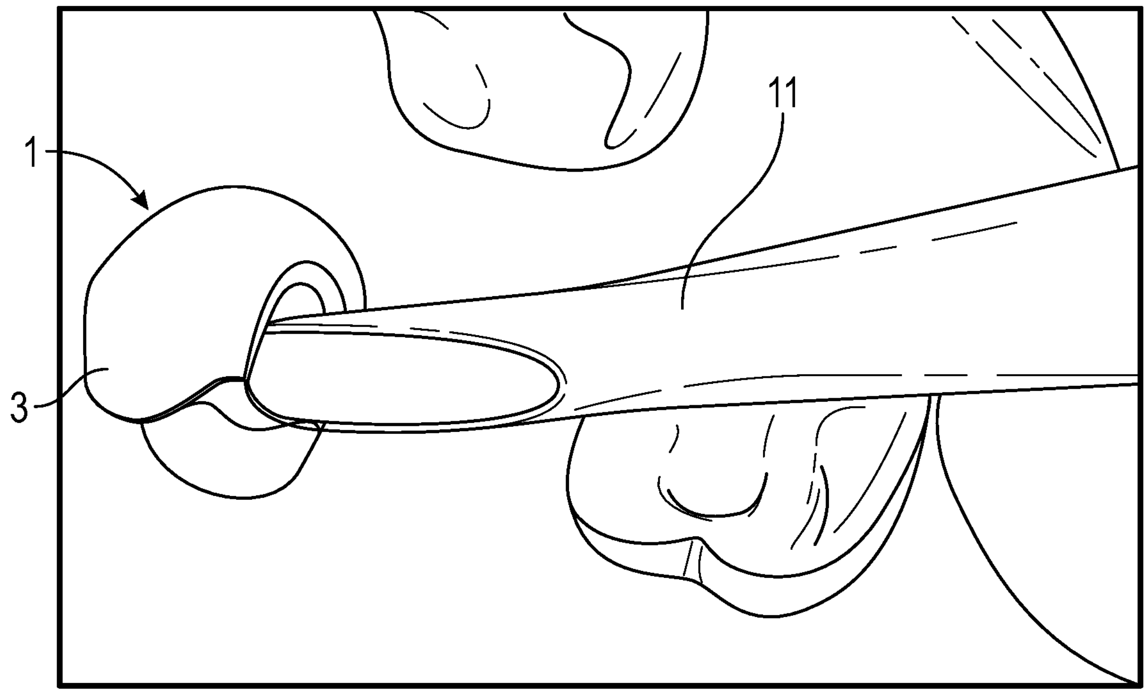
FIG. 2A
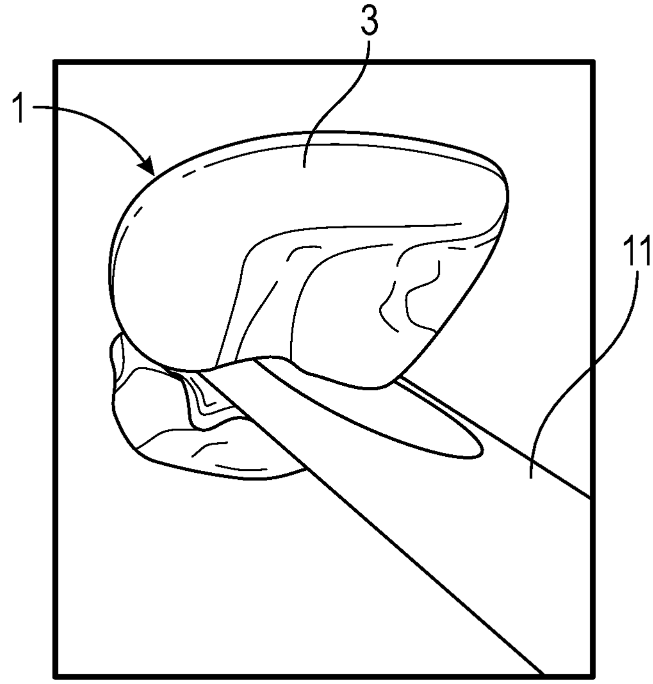
FIG. 2B
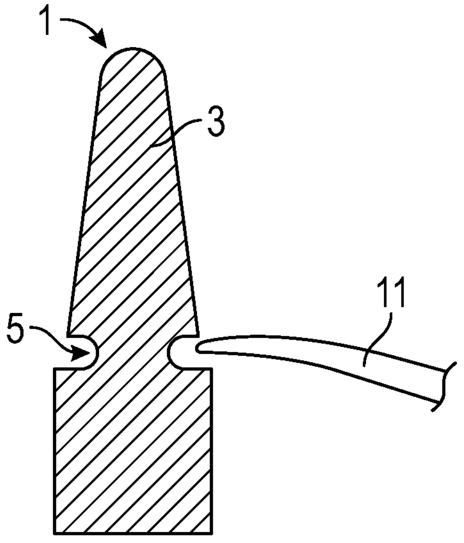
FIG. 2B.1

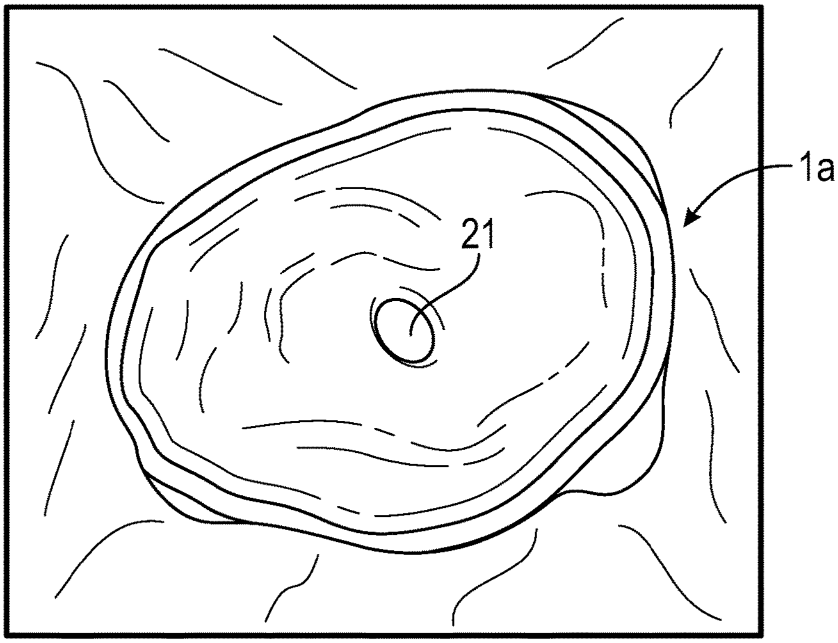
FIG. 5B
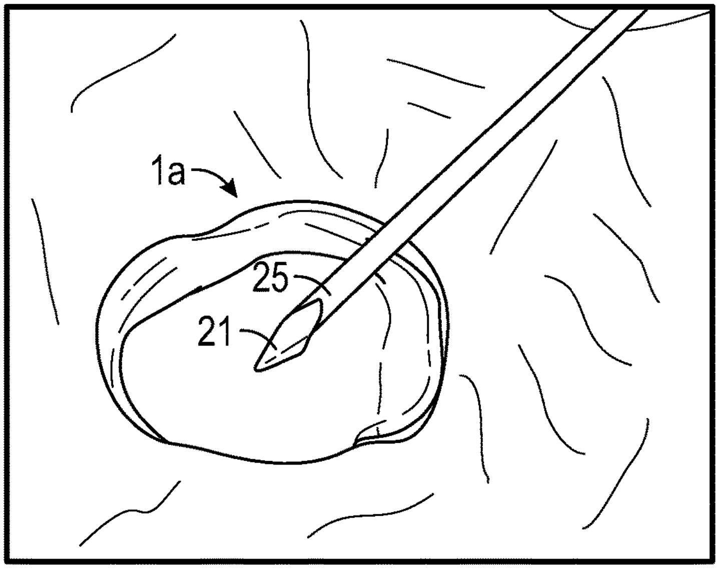
FIG. 5C
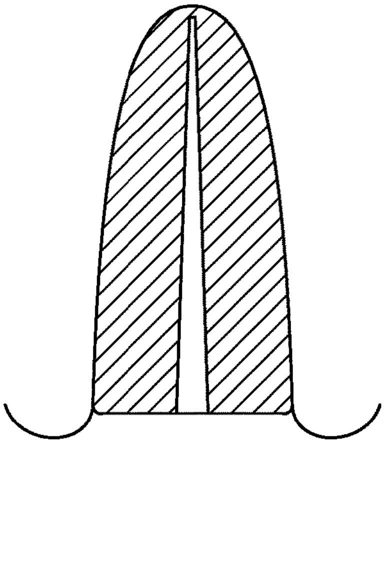
FIG. 5C.1

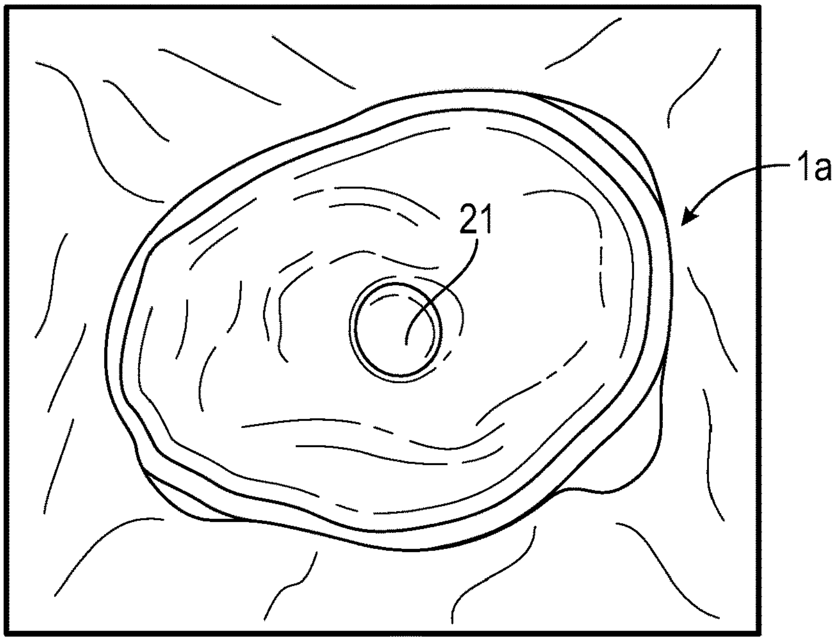
FIG. 5D
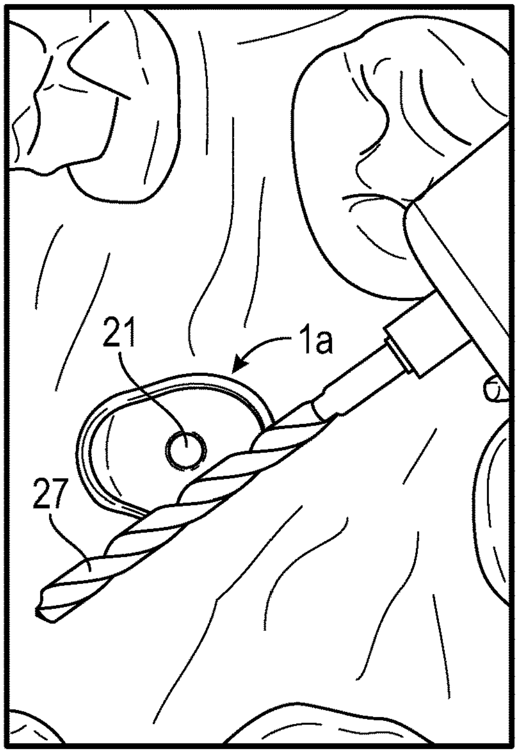
FIG. 6A
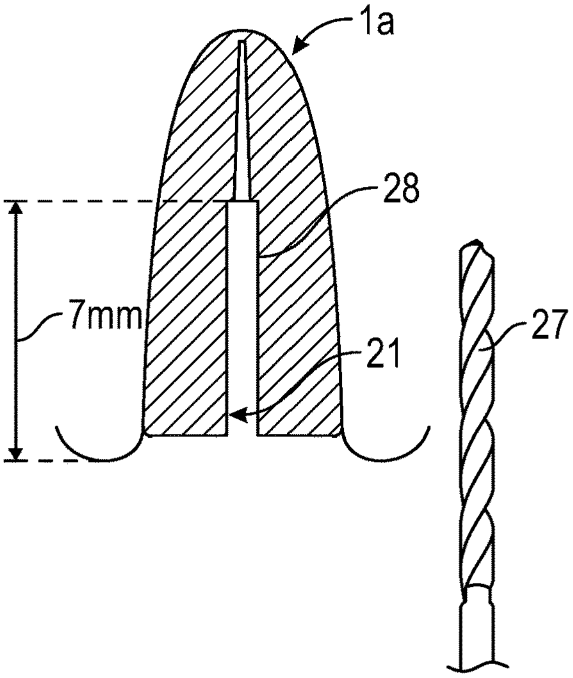
FIG. 6A.1

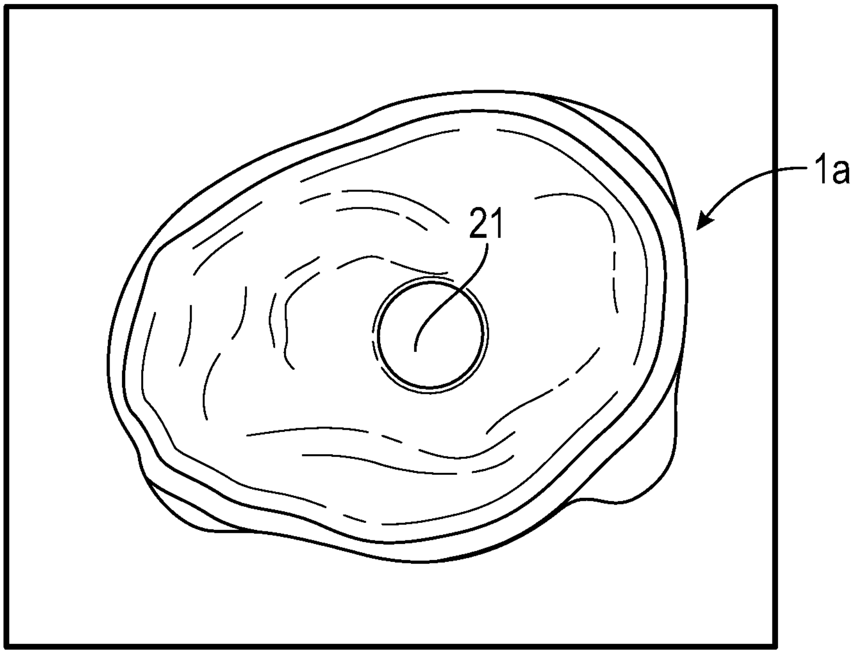
FIG. 6B
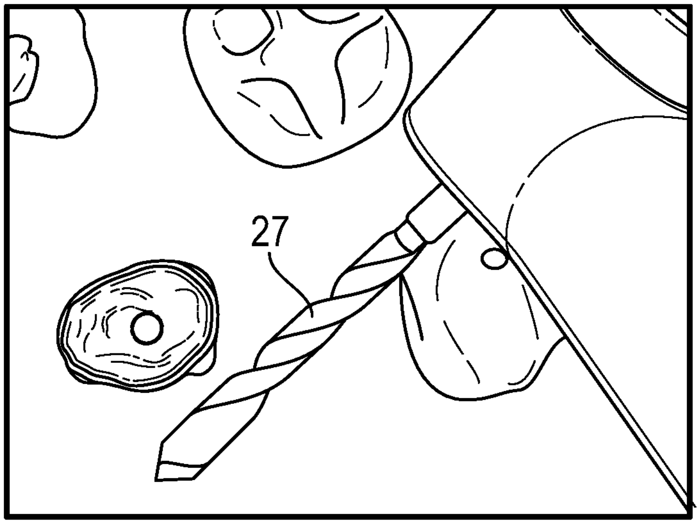
FIG. 7A
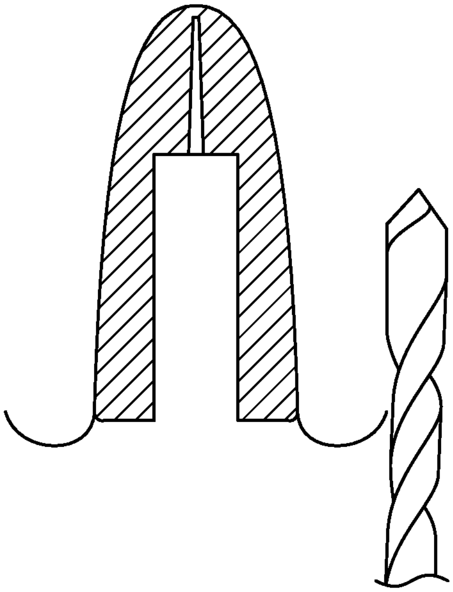
FIG. 7A.1

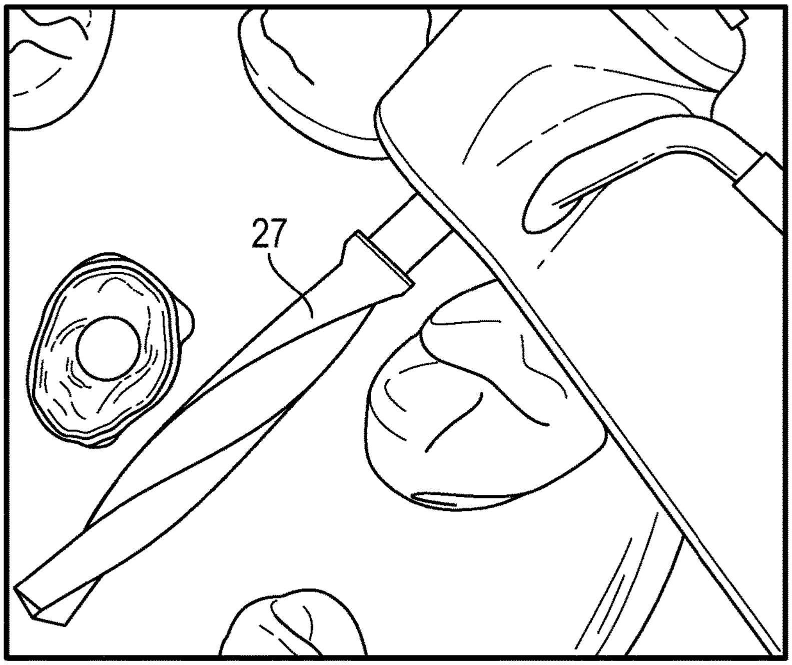
FIG. 8B
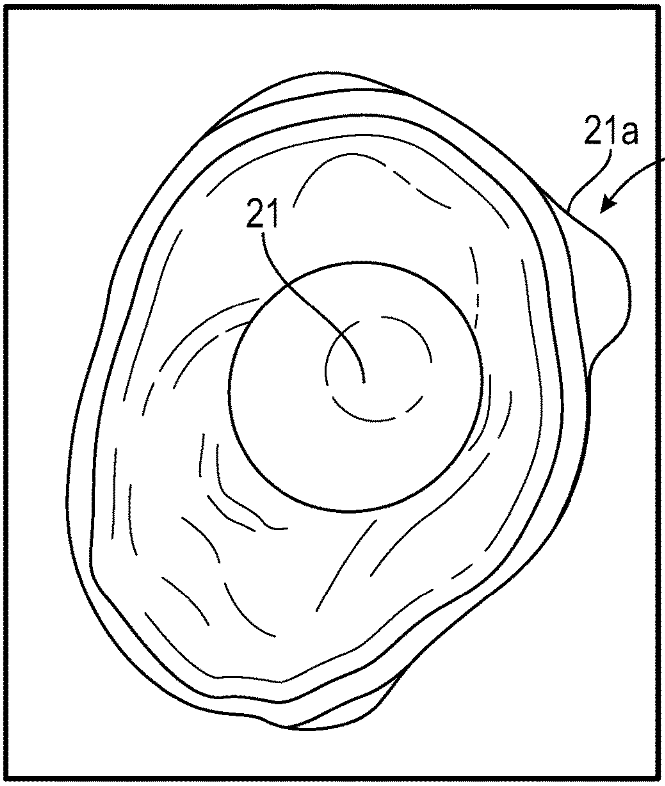
FIG. 8C
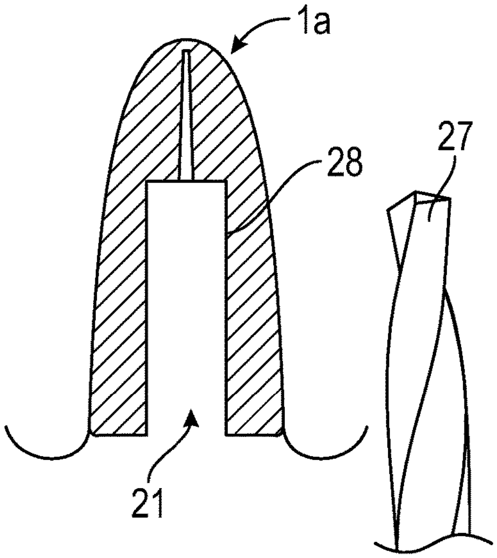
FIG. 8C.1

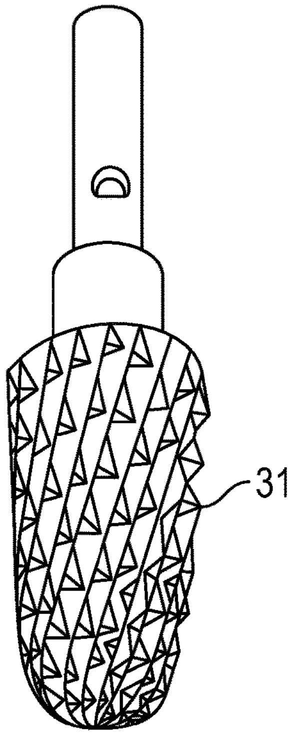
FIG. 9A
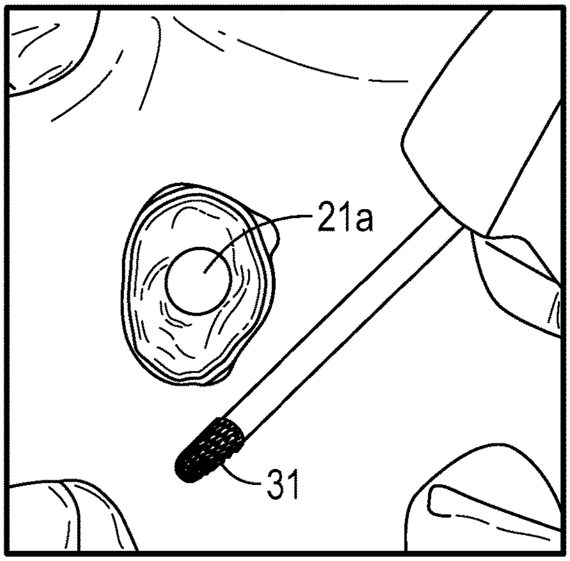
FIG. 9B
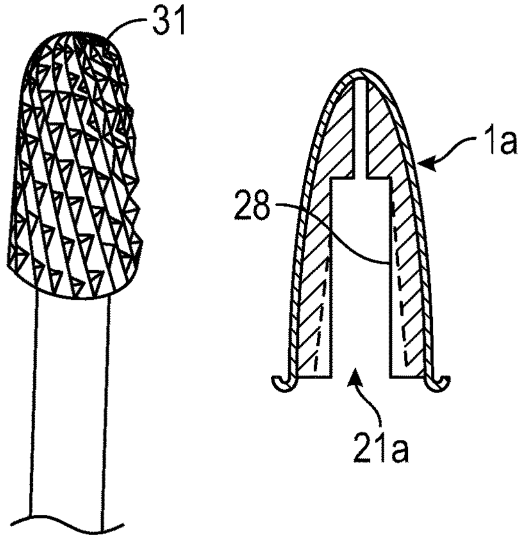
FIG. 9B.1

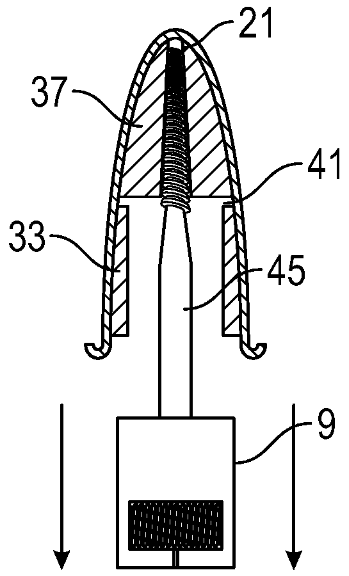
FIG. 13A.1

FIG. 14B.1

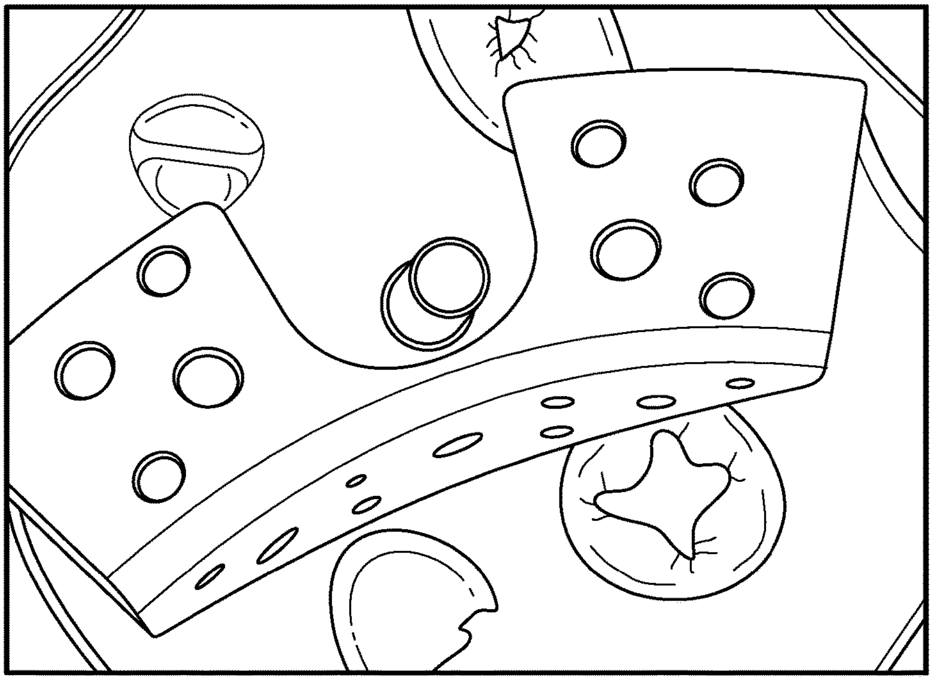
FIG. 15A
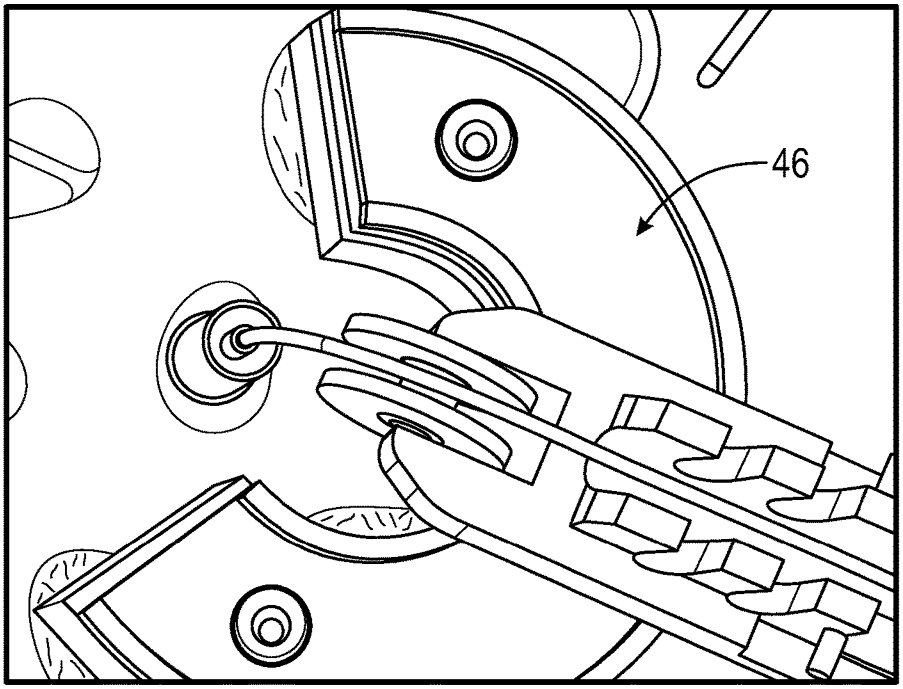
FIG. 15B
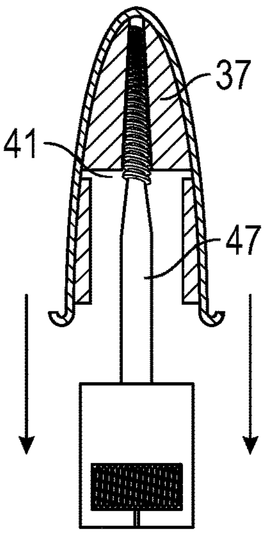
FIG. 15B.1

FIG. 16.1

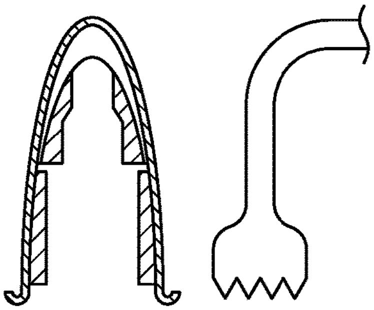
FIG. 17B.1
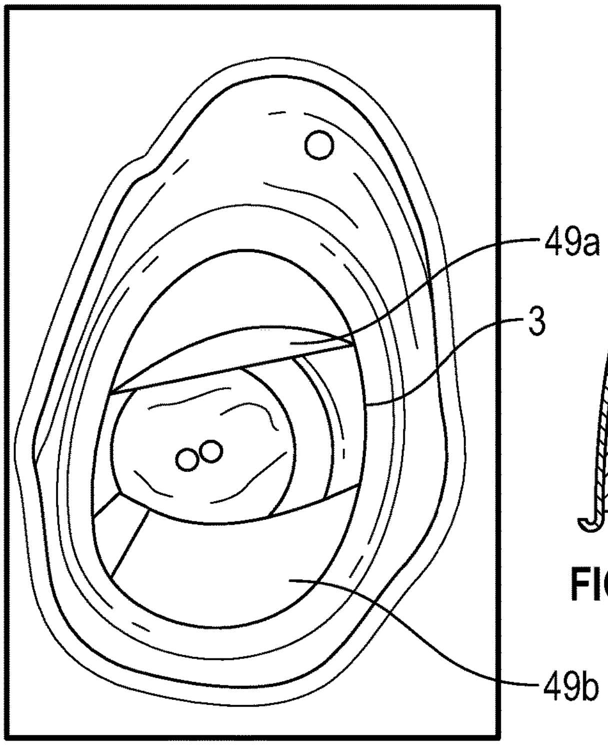
FIG. 17B
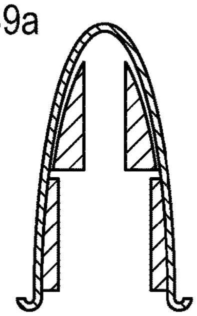
FIG. 17B.2
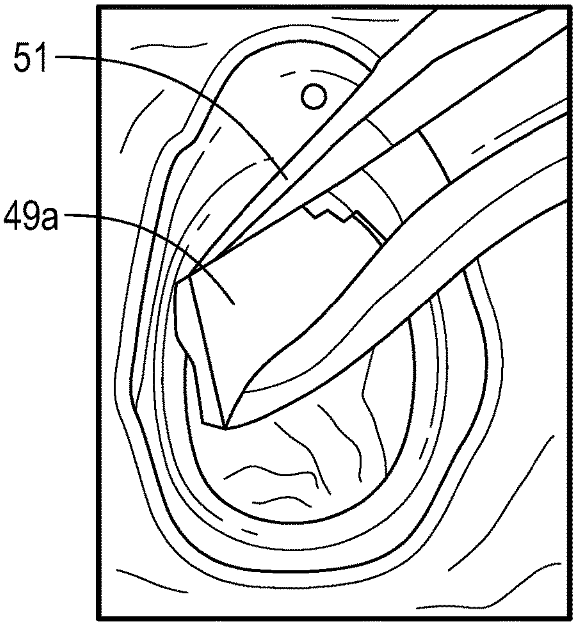
FIG. 18
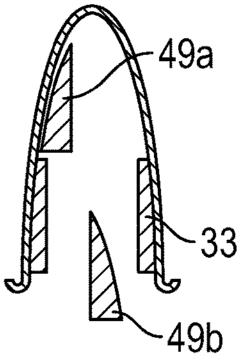
FIG. 18.1

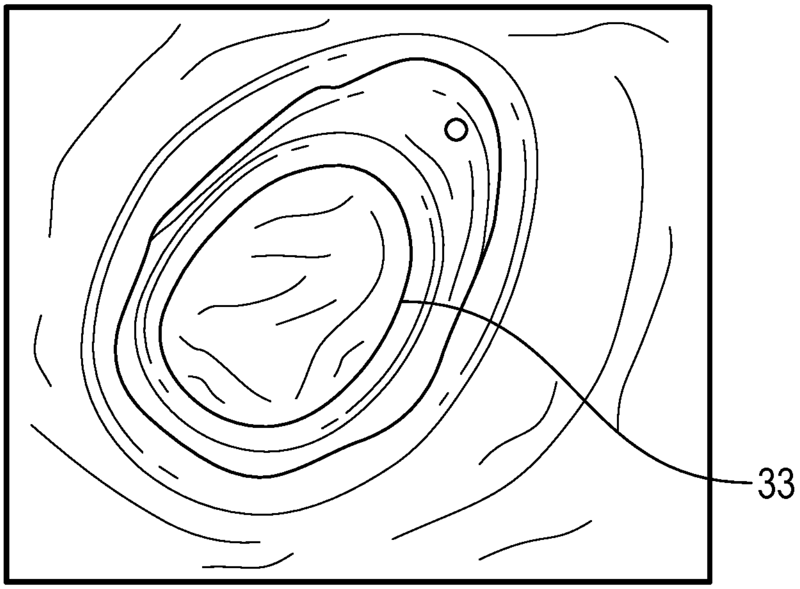
FIG. 19
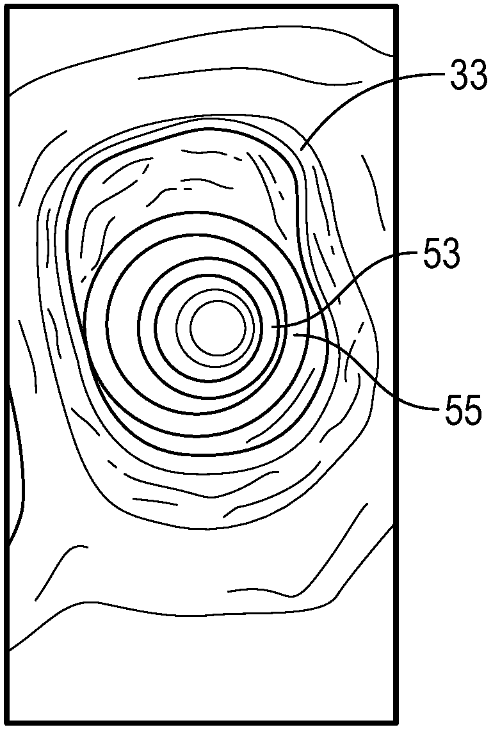
FIG. 20
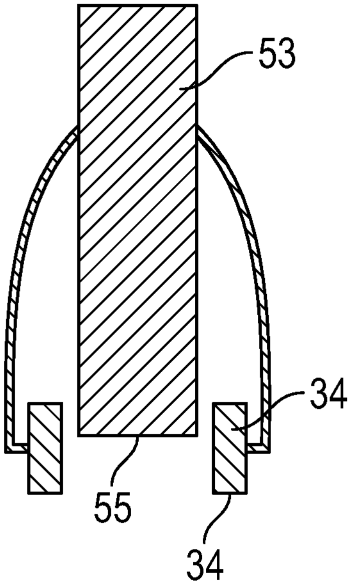
FIG. 20.1

DENTAL SURGERY METHOD

TECHNICAL FIELD

The present invention concerns a dental surgery method. The present method also relates to instruments for use in dental surgery.

BACKGROUND ART

Any references to methods, apparatus or documents of the prior art are not to be taken as constituting any evidence or admission that they formed, or form part of the common general knowledge.

Tooth extraction is associated with dimensional changes of the alveolar ridge. Bone resorption can occur in both a horizontal and vertical direction. These resorptive changes can continue for the life of the patient.

Fixed crown and bridgework is often the treatment modality of choice for replacement of missing teeth. Crowns can be supported from implants inserted into the actual tooth socket following tooth extraction. Alternatively, bridges can be used whereby the crown used to replace the missing tooth or teeth is suspended from an adjacent natural tooth or an adjacent dental implant. This is called a “pontic” crown.

Removable dentures can also be used to replace a missing tooth or teeth. Patients generally prefer a fixed solution to replace missing teeth as it is more similar in function to natural teeth.

Continued resorption of bone and gum around fixed crown and bridgework can severely compromise the aesthetic outcome of dental treatment. As the gum shrinks away from the teeth interproximally, annoying food traps are created. This inevitable atrophy following tooth loss can be particularly destructive under removable dentures. Pain can occur as the denture impinges on a reduced soft tissue base and retention of this prosthesis can be diminished with time.

This resorption of hard and soft tissues is inevitable after tooth extraction using current extraction techniques. Over the years a number of different approaches have been undertaken to address this problem. The gold standard for many years has been the addition of de-proteinized bovine bone to or adjacent to the tooth socket to offset this resorptive process. Connective Tissue Grafts have also been used extensively to increase the gum thickness to disguise this atrophy.

A newer technique to combat this problem is the “Socket Shield” technique. The socket shield technique involves leaving a buccal root segment that remains in place to avoid resorption of buccal bone and gum. A dental implant is placed behind the buccal root and is used to affix a dental crown.

A variant of this technique known as the “Pontic Shield” technique can be used to preserve the alveolar ridge under a dental bridge. A pontic crown is suspended over the extraction socket with a retained portion of the buccal root.

The present inventor believes that the Socket Shield technique is difficult for the dentist to perform and traumatic for the patient since it typically involves cutting the tooth into sectors and then drilling and levering sectors behind the buccal root segment from the bone. Such operations are time consuming and may be traumatic for the patient; often there is inadvertent damage to the site for the implantation and to the surrounding gum tissue. Mobility of the shield can also result when the sectors are removed causing the procedure to be abandoned. Only the buccal bone is supported by the tooth root and not the palatal bone. This may lead to a future atrophy of the palatal bone and gum. Furthermore, depending on the tooth involved, it is difficult for the dental surgeon to ascertain the desired geometry for the buccal root segment. Infection can develop if this geometry is incorrect and the shield extends to close the root apex. Whilst the Socket Shield technique can be performed on front teeth, it is more difficult to perform on teeth toward the back of the jaw because of limited access and complicated root morphology.

Migration and or exposure of the shield can also occur during the provisional stage of treatment as the shield is not secured to the implant itself.

It is an objective of the present invention to provide a method and apparatus that addresses one or more of the above problems.

SUMMARY OF THE INVENTION

According to a first aspect of the present invention there is provided a dental surgical method at the site of a tooth comprising the steps of:

a. de-coronating the tooth to leave a tooth root;

b. de-coring a coronal portion of the tooth root to leave a tooth ring;

c. severing an apical portion of the tooth root from the tooth ring; and d. removing the apical portion of the tooth root.

Throughout this specification, the term “coronal” will be used to refer to the portion of the tooth or tooth root that is located closer to the external surface of the gum and the term “apical” will be used to refer to the portion of the tooth or tooth root that is located deeper in the gum.

The method may include fixing an implant through the tooth ring into the bone. A crown can then be affixed to his implant to replace the missing tooth.

Alternatively, the tooth ring can serve as a foundation underneath a pontic crown or a removable denture to prevent or minimise resorption of the alveolar process.

The step of de-coronating the tooth involves removing the crown of the tooth. Preferably the step of de-coronating the tooth involves cutting into an exposed side of the tooth or about the tooth with a cutting tool and then levering the crown off the remainder of the tooth. It will be appreciated that any known technique for removing the crown of a tooth may be used in this step.

In a preferred embodiment of the invention the cutting about the tooth with the cutting tool is performed a little above a gum adjacent the tooth.

Preferably the method further includes applying a tool to the tooth root to reduce it below the gum line. For example, in the preferred embodiment of the present invention the tooth root is reduced about 2 mm below the gum line to the level of the Junctional Epithelium or further in the case of periodontal disease.

In a preferred embodiment of the present invention the step of de-coring a coronal portion of the tooth root to leave the tooth ring involves enlarging a root canal of the tooth root. For example progressively larger Gates-Gliddon drills may be used to sequentially enlarge the root canal. Progressively larger drills may then be used to further enlarge the coronal portion of the root canal to a depth of 7 mm.

In a preferred embodiment of the invention a bur is used to finally enlarge the coronal portion of the tooth root to thereby leave the tooth ring. Accordingly, preferred embodiments of this step of the present invention involve drilling into the coronal part of the tooth root to form a hole, such as an essentially circular hole, in the tooth root and then using a bur or other appropriate tool to remove additional material from the tooth root so that the coronal portion of the tooth root is reduced to a ring of tooth having a largely uniform or consistent wall thickness. Preferably the tooth ring has a wall thickness of 0.5 mm to 1.0 mm.

In embodiments where an implant is used, the ring of tooth will provide a shield for the implant.

In one embodiment, the step of removing part of the coronal portion of the tooth root to leave a tooth ring involves forming a hole in the tooth root to a desired depth, the hole having an essentially flat base, and using a bur or other tool to remove additional tooth material located laterally of the hole. The essentially flat base of the hole assists in locating a base part of the tool that is used to remove the lateral tooth material.

In one embodiment of the present invention, the step of severing the apical portion of the tooth root from the tooth ring includes making a peripheral opening through a lower part of the tooth ring to thereby remove a peripheral region of the tooth root to leave a coronal tooth ring and an apical tooth root. In one embodiment, the peripheral opening may be made through a base of a coronal flaring of the tooth root. In one embodiment, the peripheral opening may be made with a bur having a "T" profile wherein the edges of the cross bar of the "T" are formed to cut tooth material.

The peripheral opening that is used to sever the apical tooth root from the tooth ring may desirably have a height in the range of 1 mm to 3 mm.

Once the apical tooth root has been severed from the tooth ring, the apical tooth root may then be fully removed. In one embodiment, the step of removing the apical tooth root involves loosening the tooth root and then removing the tooth root from the socket or gum.

In one embodiment, the step of extracting the apical root portion of the tooth from the bone includes drilling a hole in the root portion and affixing an anchor (such as a post) therein. The post may then be coupled to an extraction mechanism whereby operation of the extraction mechanism causes the anchor to sufficiently tension the root portion to thereby detach it from the bone. For example, the withdrawal mechanism may comprise a line and pulley tool, such as a "Benex" (http://www.benex-dent.com/en/) or alternatively it may comprise a swiveling screw jack.

The step of loosening the apical tooth root may involve pulling the apical tooth root outwardly towards the gum. In embodiments where the step of severing the apical tooth root from the tooth ring involves forming a peripheral opening having a longitudinal length, a space or a gap is formed between the tooth ring and the severed apical tooth root. Pulling the apical tooth root towards the gum results in the apical tooth root being loosened from the tissues in the tooth socket. The apical tooth root can move into the space or gap towards the tooth ring, thereby facilitating loosening of the tooth root.

In some embodiments, the step of removing the apical portion of the tooth root includes withdrawing the detached apical root portion through the tooth ring in either a single piece or in sections.

In a preferred embodiment of the invention, where the detached root is too large to pass through a lumen or opening of the tooth ring, then the method may further include sectioning the detached root and withdrawing sections of the detached root through the lumen or opening of the tooth ring. Sectioning may be done using any suitable technique, such as with a long-shank surgical round bur on a high-torque water-cooled surgical handpiece. Alternatively, a saw tip, mounted on a piezo-electric handpiece, may be used to section the detached root.

In an alternative embodiment, the apical tooth root portion may be removed by surgical extraction through the gum and not through the lumen of the tooth ring. In this embodiment, it may not be necessary to loosen the apical tooth root prior to surgical extraction.

In embodiments where an implant is fixed into the tooth socket, the step of fixing the implant through the tooth ring into the bone may include positioning a crest of the implant at or slightly below the level of the tooth ring so that unobstructed access to the internal surface of the implant is provided.

In embodiments whereby the implant cannot be fixed to the tooth ring as the tooth ring is much larger than the implant diameter, prosthetic attachments connected to the implant can be used to engage the tooth ring.

In a further aspect, the present invention provides a device for detaching a tooth root comprising:

a) a lead screw having a threaded point for screwing into the tooth root, b) a swiveling member having a bore through which the lead screw passes, the lead screw being extendable and retractable through the bore, and c) a platform for supporting the swiveling member, the platform including an opening for passage of the threaded point therethrough.

In one embodiment, the lead screw has a threaded portion that engages with a threaded portion in the bore of the swiveling member, such that rotation of the lead screw relative to the bore causes the lead screw to extend or retract through the bore.

In one embodiment, the platform has a curved recess, the curved recess having an opening in the lower part thereof, the lead screw passing through the opening in the curved recess. The swiveling member may comprise a curved region of complementary shape to the curved recess in the platform, the curved region of the swiveling member being received in the curved recess of the platform. In this manner, the curved region can slide relative to the complementary curved recess of the platform, thereby enabling the swiveling member to swivel. When the lead screw is positioned through the swiveling member, the lead screw can also swivel relative to the platform.

In one embodiment, the swiveling member comprises a threaded nut defining at least part of the bore extending through the swiveling member, the threaded nut receiving a complementary threaded portion of the lead screw. Rotation of the lead screw relative to the threaded nut causes extension or retraction of the lead screw relative to the threaded nut.

The lead screw may have an engagement region at or near one end, the engagement region receiving a turning tool, such as a spanner or a handwheel or a knurled knob. In this manner, the lead screw can be rotated by the surgeon to cause the lead screw to extend through the swivel member. When the threaded point of the lead screw comes into contact with the tooth root, continued rotation of the lead screw causes the threaded point to screw into the tooth. The lead screw may then be retracted in order to detach or remove the tooth root.

In one embodiment, retraction of the lead screw is caused by rotating the threaded nut. As the lead screw is effectively fixed in positioned by virtue of being attached to the tooth root, rotation of the threaded nut in the appropriate direction causes the lead screw to be retracted out of the gum, thereby detaching or extracting the tooth root.

In one embodiment, a thrust washer or a thrust bearing may be located in the swiveling member such that rotation of the lead screw relative to the threaded nut does not result in rotation of the swiveling member. In this manner, rotation of the lead screw to drive the lead screw into the tooth root does not cause rotation of the swivel. Similarly, rotation of the threaded nut to retract the lead screw also does not cause rotation of the swivel.

In one embodiment, the platform is provided with a cushion. The cushion may rest on the patient's teeth during the procedure. The cushion may comprise a silicone material or a rubber material or hard plastic. The cushion may be releasably attached to the platform. The cushion may comprise a disposable article. Cushions of different height can be used to level the platform. Larger cushions can be used where adjacent teeth are missing.

The platform is suitably made of a rigid material. The platform may be made from metal, such as a surgical grade metal or a surgical grade stainless steel, or from a rigid plastic material. The platform may comprise a single use platform or it may be a re-usable platform. It will be appreciated that if the platform is re-usable, it will need to be sterilised after each procedure.

The swiveling member may comprise a unitary member having a bore passing therethrough. In other embodiments, the swiveling member may be made from two or more components that are joined together. The swiveling member may be made from metal, such as a surgical grade metal or a surgical grade stainless steel, or from a rigid plastic material. The swiveling member may comprise a single use swiveling member, or it may be a re-usable swiveling member. It will be appreciated that if the swiveling member is re-usable, it will need to be sterilised after each procedure.

In another embodiment, the bore through the swiveling member need not have a threaded region. In this embodiment, the lead screw may simply be inserted through the bore and then rotation of the lead screw when it comes into contact with the tooth root causes the threaded point of the lead screw to screw into the tooth root. When the threaded point has been attached to the tooth root to the satisfaction of the surgeon, the lead screw may be pulled away from the gum of the patient, to thereby detach or remove the tooth root from the gum.

According to a further aspect of the present invention there is provided a tooth root detachment instrument comprising:

a. a lead screw including a screw portion about which an operative member, for example a nut, is threaded for translating the lead screw and a threaded point for screwing into the tooth root;

b. a swiveling member having a bore traversed by the lead screw wherein the operative member captures the threaded portion on a coronal side of the swiveling member; and c. a platform for supporting the swiveling member including an opening for passage of the point therethrough.

Preferably the swiveling member includes a hemispherical portion. The swivelling mechanism or hemispherical portion is preferably made from a rigid material.

A coupling formation fast with the lead screw may be provided for applying rotation to the lead screw to thereby screw the point into the tooth root.

In a preferred embodiment of the invention the instrument includes a rotatable handle arranged to mate with the coupling formation whereby rotation of the rotatable handle is transmitted to the lead screw by means of the coupling formation.

In some embodiments, a thrust washer or a thrust bearing may be located between the operative member and the swivelling member such that rotation of the operative member does not cause rotation of the swivelling member.

The platform may be shaped for positioning over one of an anterior, posterior or canine tooth.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows:

FIGS. 2A, 2B and 2B.1 illustrate the use of a lever to separate the crown from the remainder of the tooth to thereby leave a tooth root.

FIGS. 5A to 5D show the use of progressively larger Gates-Gliddon drills to sequentially enlarge the canal.

FIGS. 6A, 6A.1 and 6B illustrate the use of a first diameter drill bit to further enlarge the coronal portion of the canal.

FIGS. 8A to 8C.1 illustrate the use of progressively larger diameter drill bits to further enlarge the coronal portion of the canal.

FIG. 9A to 9D depict a custom-tapered bur and its use in milling-out the tooth root around the canal to leave a tooth ring at the coronal portion of the tooth.

FIGS. 15A to 15B.1 illustrate the fixing of the post to a root extraction device.

FIGS. 17A and 17B illustrate the sectioning of the detached apical root.

FIG. 17B.1 illustrates the end of a piezo saw tool for sectioning the detached root.

FIG. 17B.2 is a sagittal cross-sectional view of the sectioned detached tooth.

FIGS. 18 and 18.1 illustrate the removal of the sectioned root through the lumen of the tooth ring.

FIG. 19 shows the tooth ring left intact subsequent to removal of the sectioned root.

FIGS. 20 and 20.1 show the implant placed through the tooth ring and secured to the underlying bone.

DETAILED DESCRIPTION OF PREFERRED EMBODIMENTS

Figure 1A:
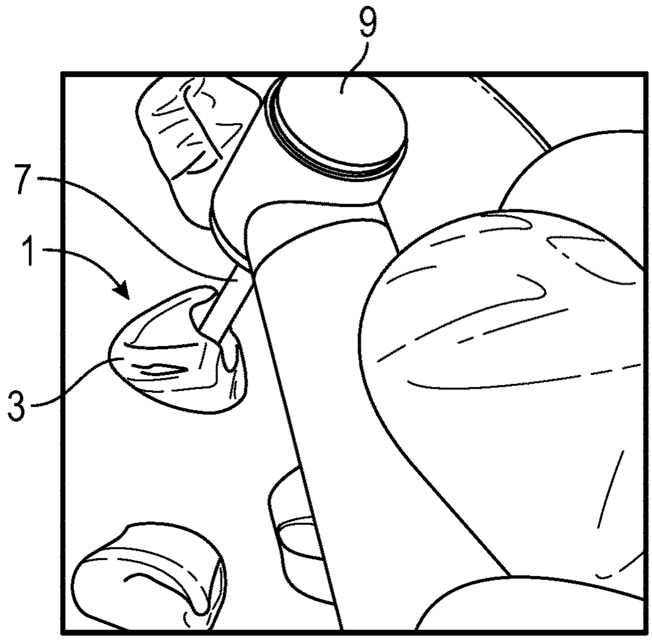
FIGS. 1A, 1A.1 and 1B illustrate cutting into a side of a crown of a tooth, being a first stage in de-coronation of the tooth.
Figure 1B:
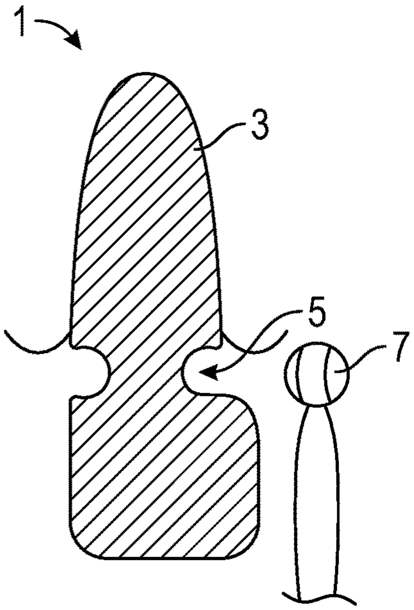
Figure 1B:
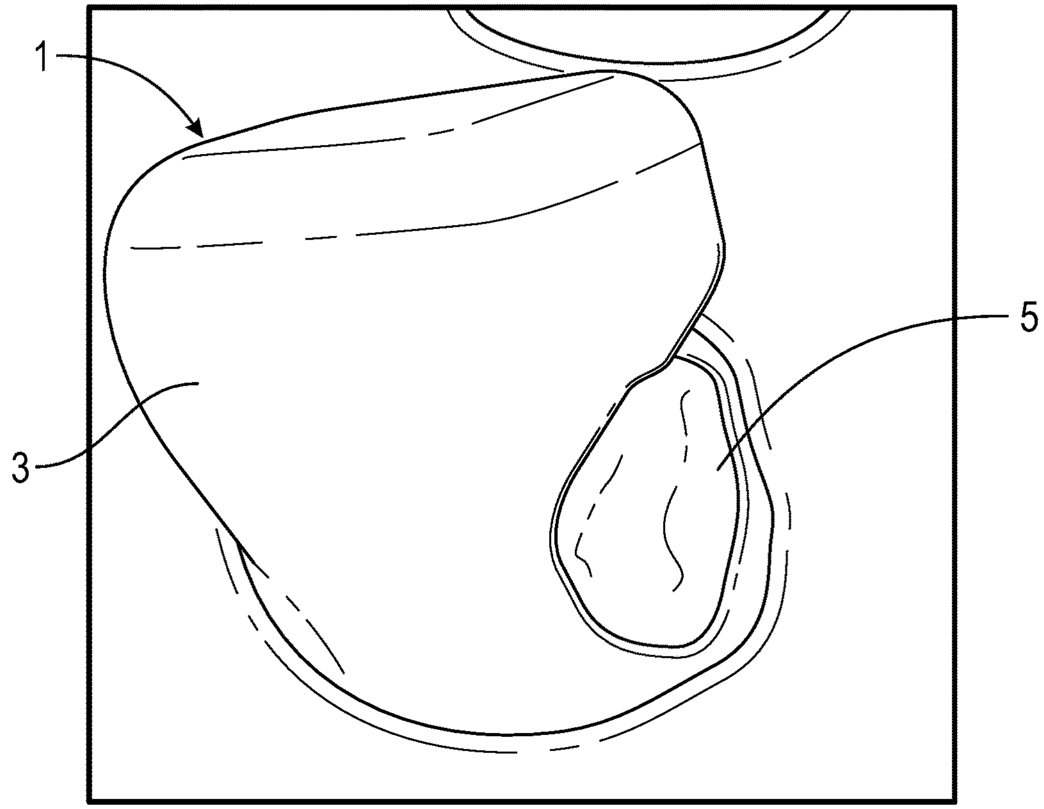

A method for fixing a dental implant according to a preferred embodiment of the present invention will now be described. Initially, as illustrated in FIGS. 1A, 1A.1 and 1B, a side of the crown 3 of the tooth 1 is cut away or removed to form a recess 5 by means of a bur 7, such as a round bur or long-tapered bur driven by a high-torque, water-cooled, high-speed handpiece 9. The bur is used to cut the recess 5 into part of the outer periphery of the tooth, a little above the gum line.

Figure 3A:
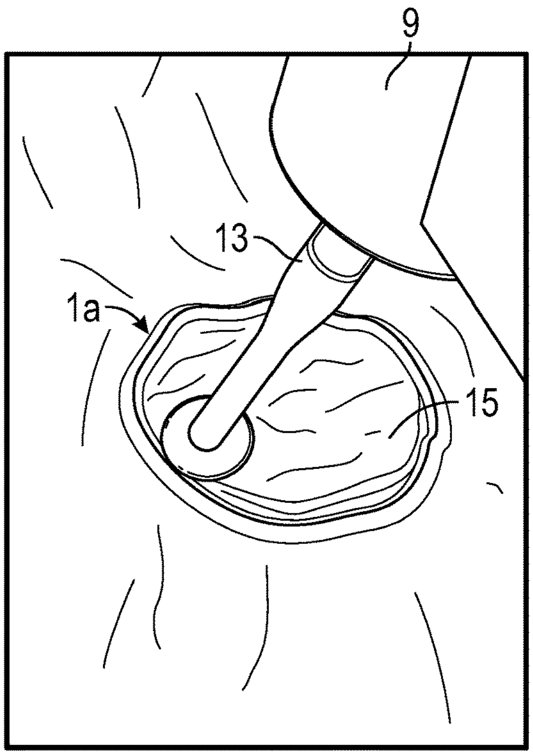
FIGS. 3A, 3A.1 and 3B illustrate the use of a bur to reduce the root below the gum line.
Figure 3B:
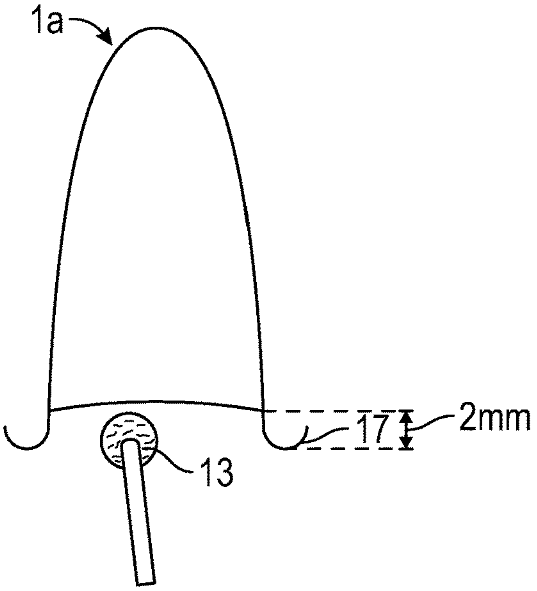
Figure 3B:
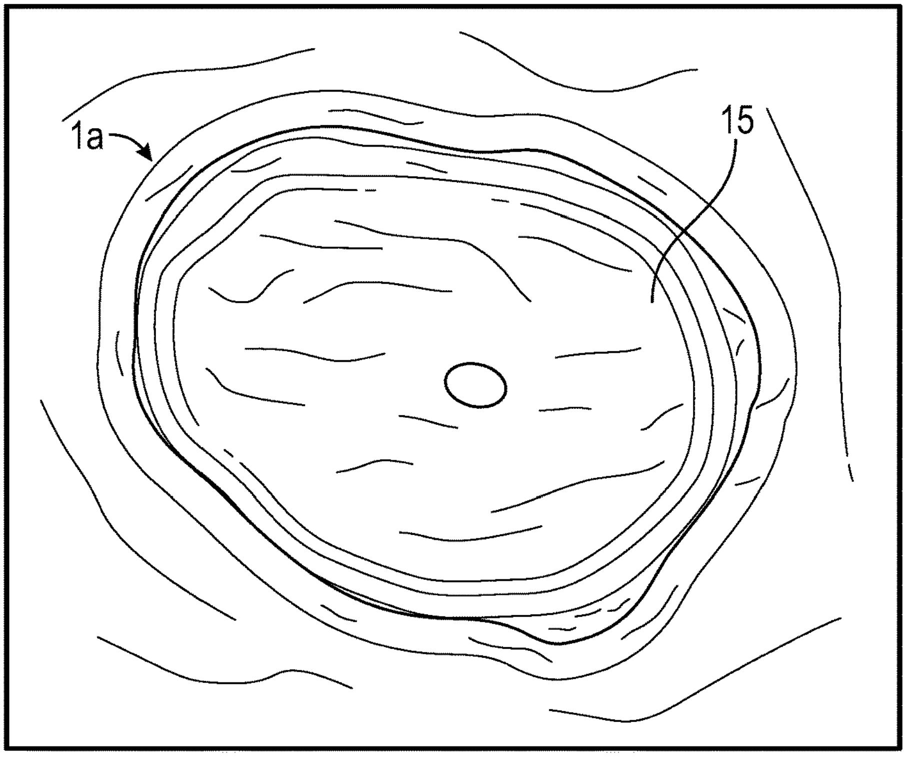

With reference to FIGS. 2A, 2B, 2B.1 a crowbar 11, such as a Luxator or similar instrument, is used to snap the crown 3 from the tooth 1 to thereby leave a de-coronated tooth 1*a* (as shown in FIG. 3A).

Referring now to FIGS. 3A, 3A.1 and 3B, a large round diamond bur 13 is fitted to handpiece 9 and is then used to reduce the root 15 of the de-coronated root 1*a* to about 2 mm below the gum line 17, or further in the case of periodontal disease.

Figure 4:
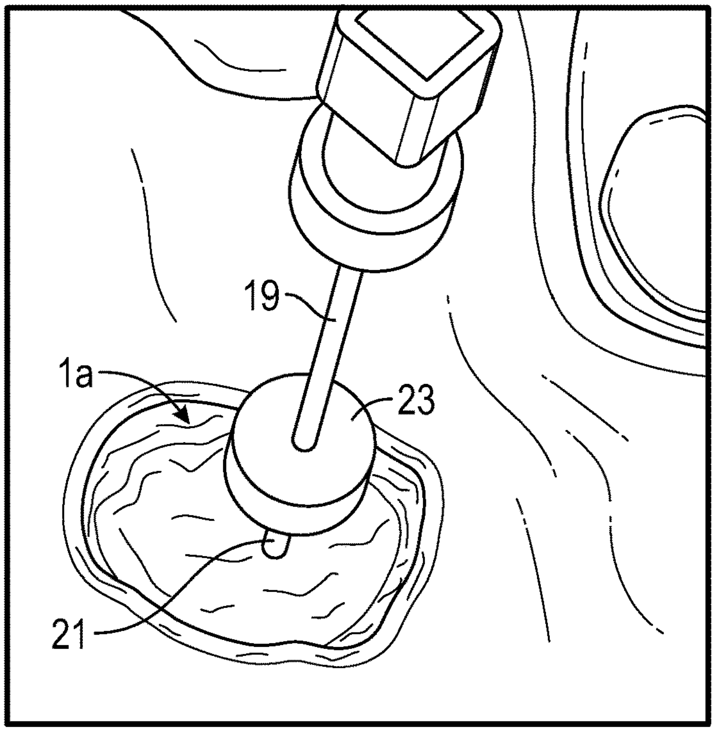
FIGS. 4 and 4.1 show the use of root canal files to enlarge the root canal.
Figure 5A:
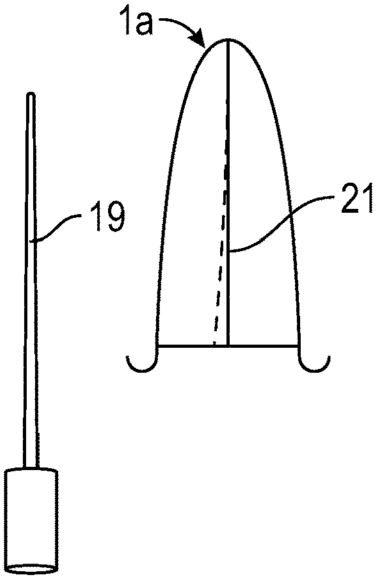
Figure 5A:
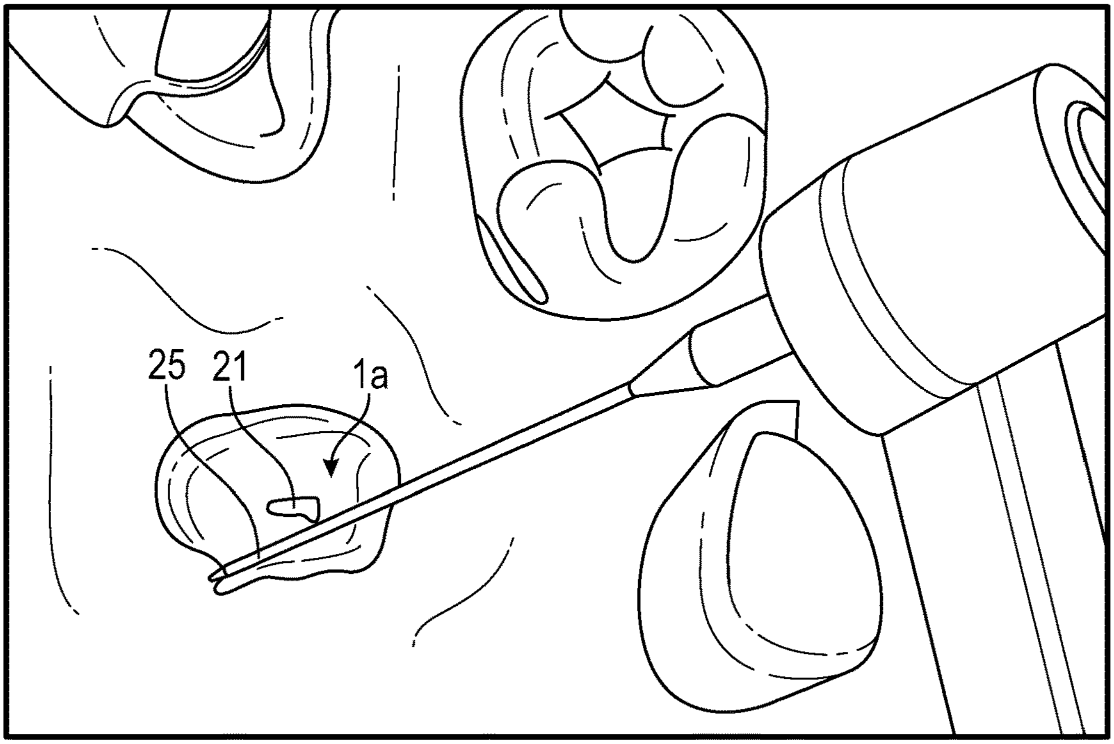

As illustrated in FIGS. 4 and 4.1, a conventional root canal file 19 is then used to access the root canal system 21 of the tooth root 1*a*. Canal(s) can then be enlarged. Penetration control, by means of a stop 23, is suggested for abnormally short teeth or those in close proximity to the Inferior Alveolar Nerve in the mandible.

Referring now to FIGS. 5A-5D, Gates-Gliddon drills 25 can then be used sequentially to enlarge the canal(s) 21 further. Sizes 1, 3, 5 are usually sufficient for adequate enlargement.

Figure 7B:
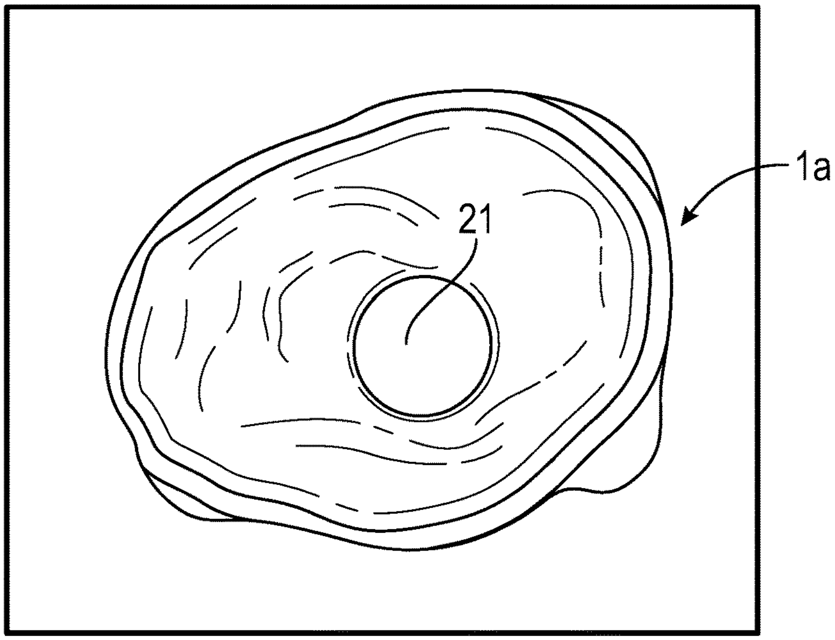
FIGS. 7A, 7A.1 and 7B illustrate the use of a second, larger diameter drill bit to further enlarge the coronal portion of the canal.

A 1.5 mm diameter drill bit 27 is next used to further enlarge the coronal portion of the canal to a depth of 7 mm as shown in FIGS. 6A and 6B. A 2 mm diameter drill bit 27 is then used to further enlarge the coronal portion of the canal to the depth of 7 mm as shown in FIGS. 7A and 7B.

Figure 8A:
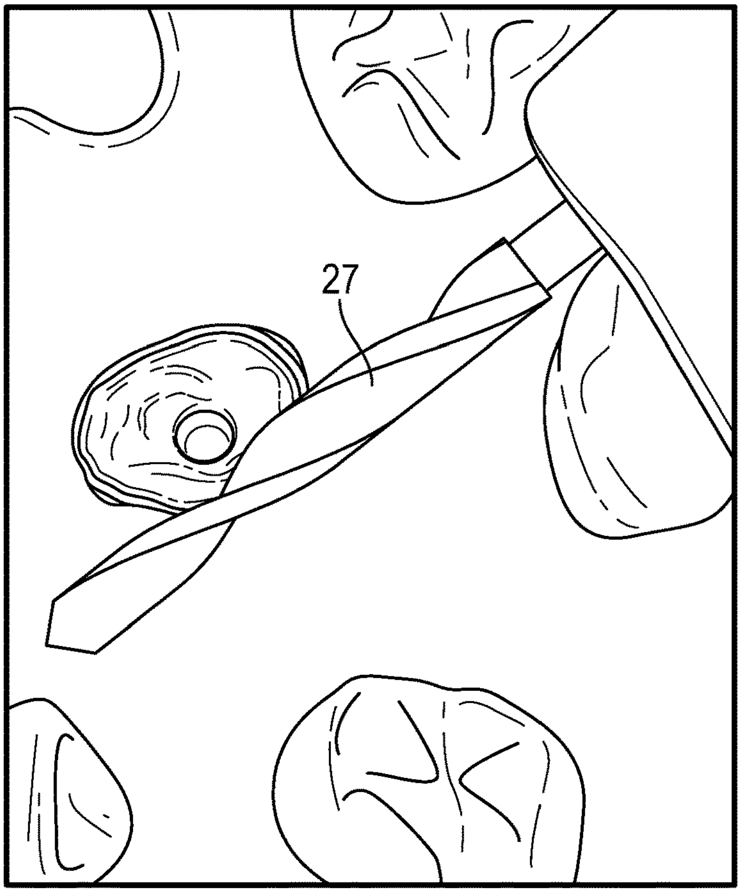
Figure 9C:
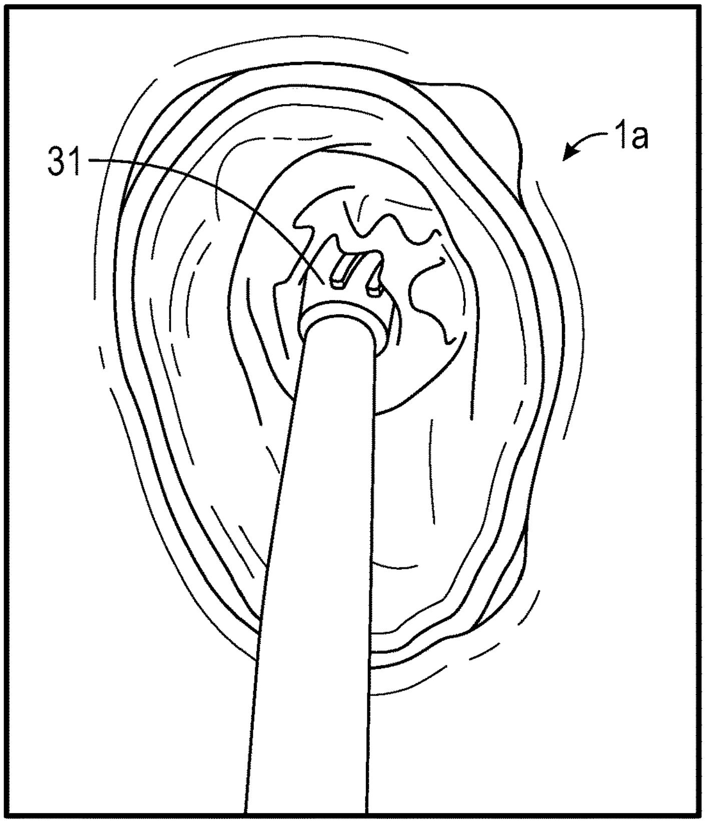
Figure 9D:
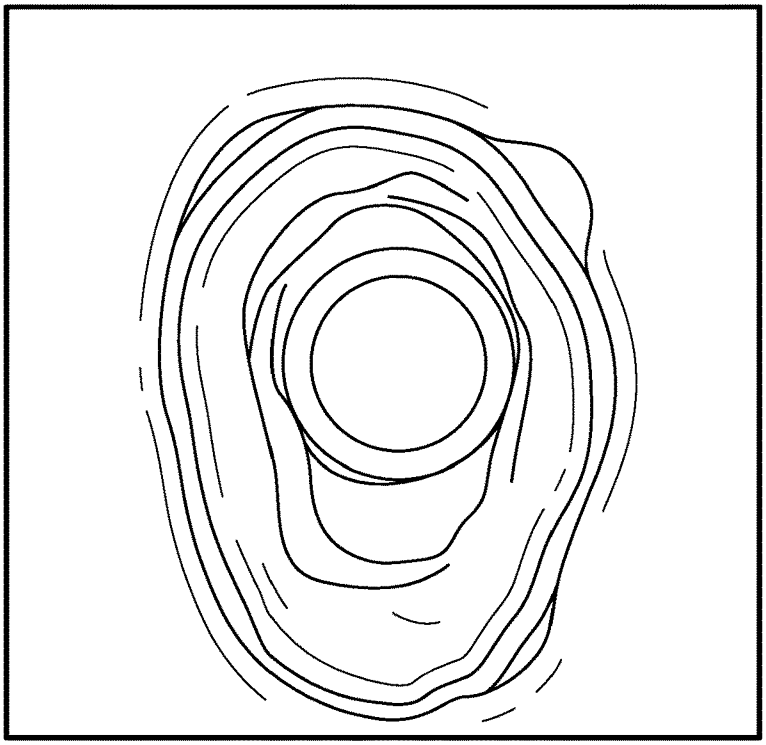

As illustrated in FIGS. 8A to 8C.1, sequentially larger drill bits 27 are then used to successively enlarge the coronal 7 mm portion 28 of the canal 21 until minimum thickness of the tooth ring approaches 0.5 mm to 1 mm. At this stage, a generally circular hole 21A has been formed in the coronal portion of the tooth root. However, there remains a significant amount of tooth material left between the generally circular hole 21A and the outer periphery of the tooth. The next steps in the method of this embodiment of the present invention involve removing a significant proportion of that tooth material between the generally circular hole 21A and the periphery of the tooth such that a ring of tooth (or a tooth ring) is left, with the tooth ring having a largely uniform wall thickness around its periphery.

With reference to FIGS. 9A to 9D, a custom tapered bur with a flat non-cutting base 31 is applied at high torque and high speed (max 80,000 RPM) to continue enlargement of coronal portion 28 of the canal 21. The shape of the preparation should follow the anatomical outline of the de-coronated tooth 1*a*. Water-cooling is not essential at this point providing no perforations are made. The depth of this flaring vertically is performed to a depth of 7 mm. For multi-rooted teeth, de-coring of the entire pulpal chamber using a tapered bur is the first step. The pulpal floor is removed in its entirety and the roots are then severed at or slightly below the furcation level using the custom "T" bur. This level is calculated so that 4 mm+1 mm of the tooth ring is preserved above the cut made by the "T" bur. Care must be taken not to perforate the shield on multi-rooted teeth by careful observation of the root morphology. The tooth ring that connects the tooth roots is where most perforations occur. For periodontally-affected molars, the bone may be apical to the furcation area. In this case, the roots can be prepared separately as with single-rooted anterior teeth.

Figure 10:
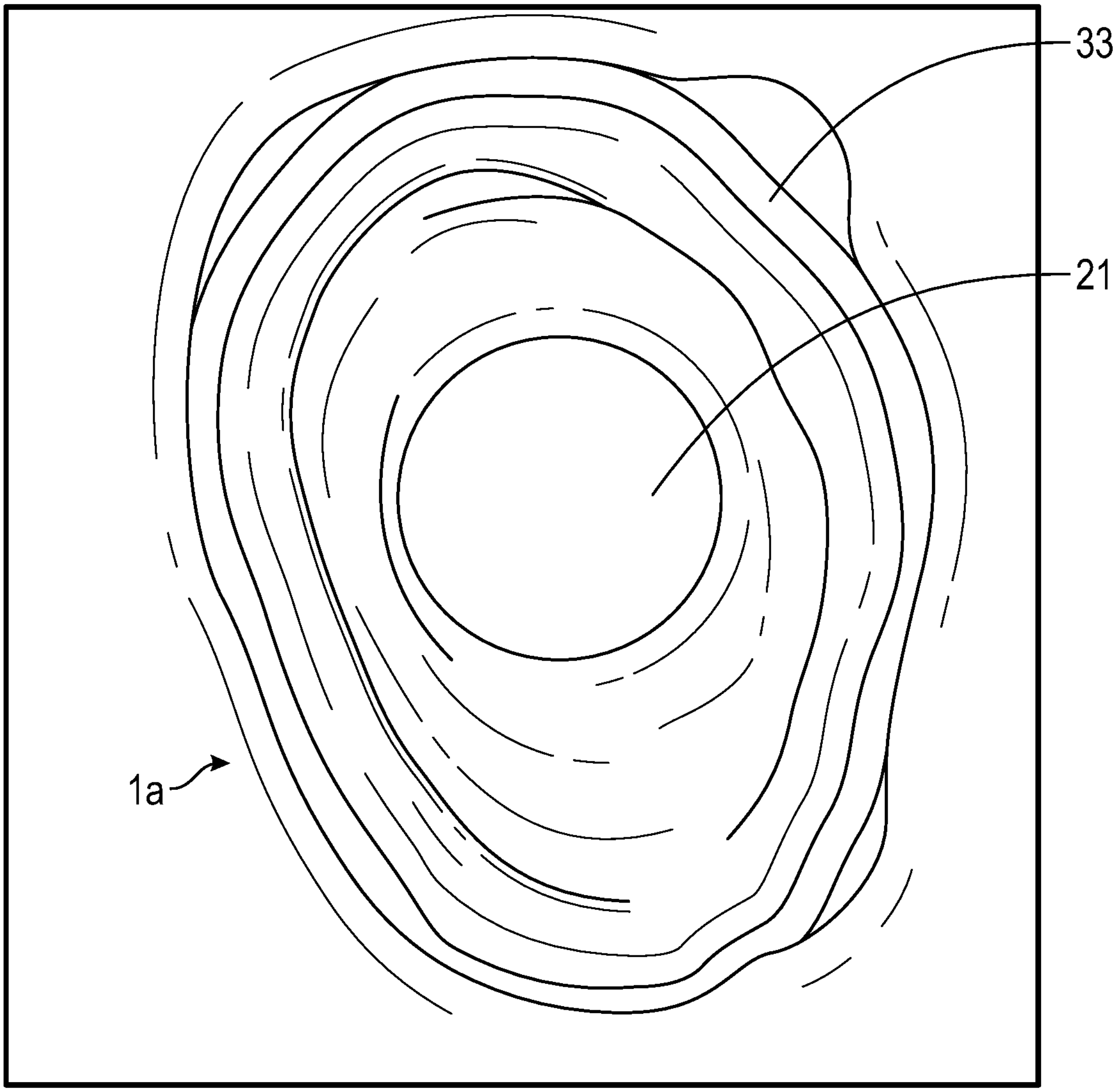
FIGS. 10 and 10.1 show plan and sagittal cross sectional views of the tooth ring.

As illustrated in FIG. 10 at the end of the application of the bur 31 a ring of tooth, i.e. tooth ring 33, is formed that will ultimately act as a shield to prevent resorption of bone. The wall thickness of the tooth ring 33 is roughly 0.5 mm to 1.0 mm in width. The tooth ring may have a height or depth that is around 4±1 mm, although variations from this measurement are possible. Essentially, the tooth ring 33 remains in the tooth socket and provides a surface of natural tooth material remaining in the gum that reinforces and strengthens the tooth socket.

Figure 11A:
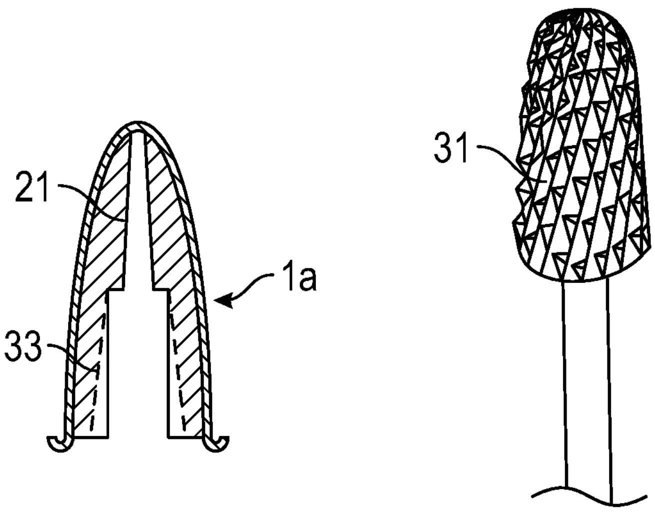
FIGS. 11A to 11C show the use of a "T" shaped bur to sever the tooth root from the tooth ring.
Figure 11A:
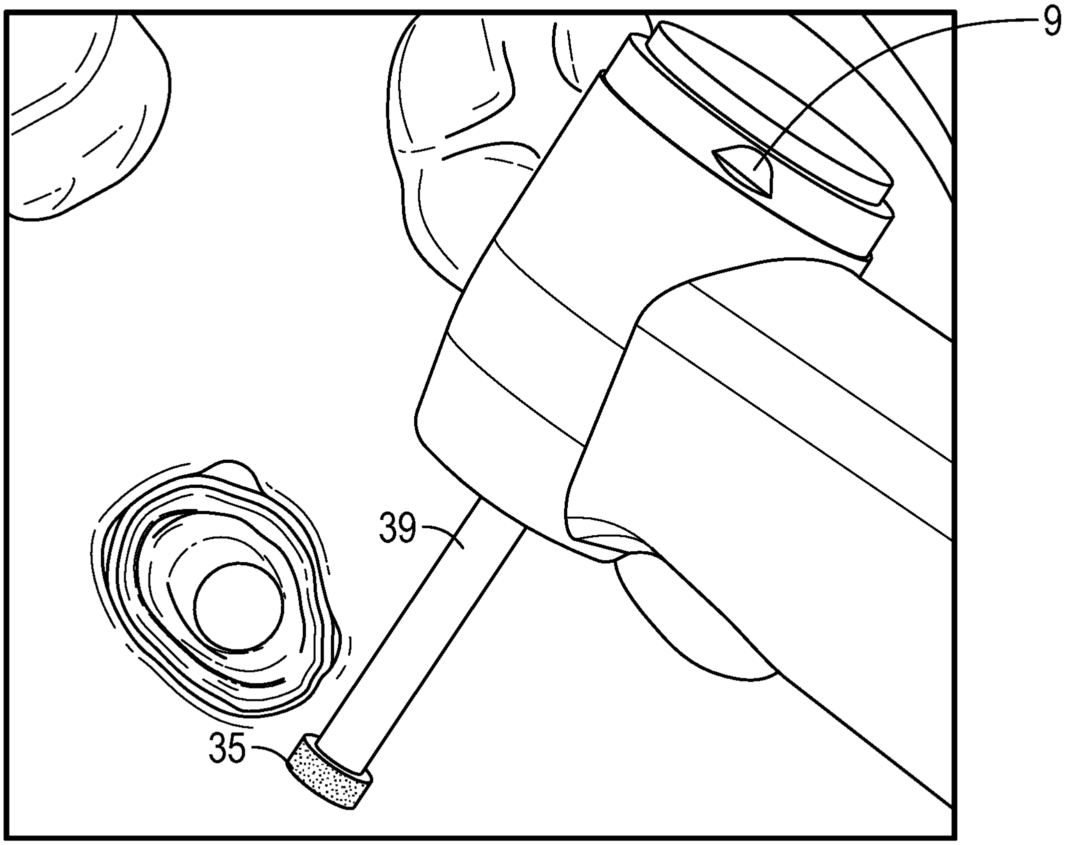
Figure 11B:
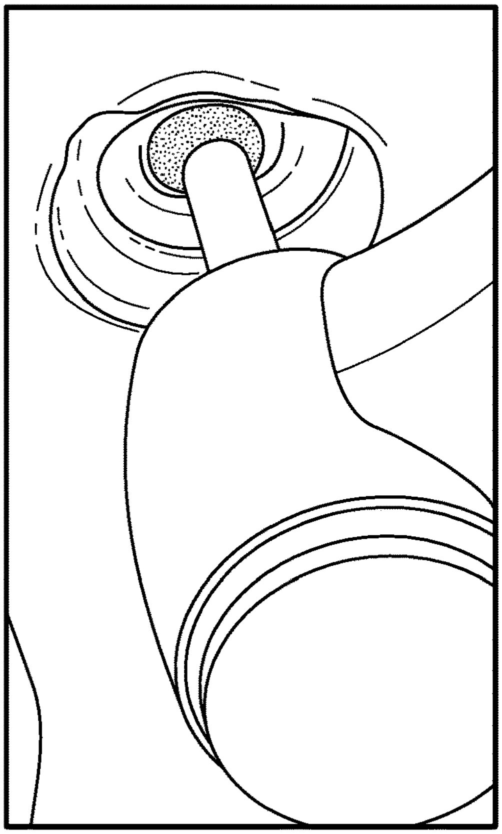
Figure 11C:
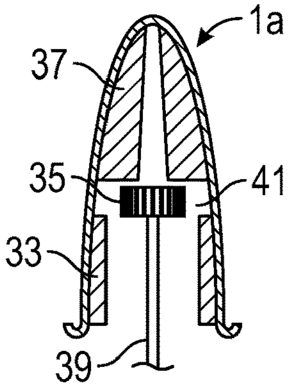
Figure 11C:
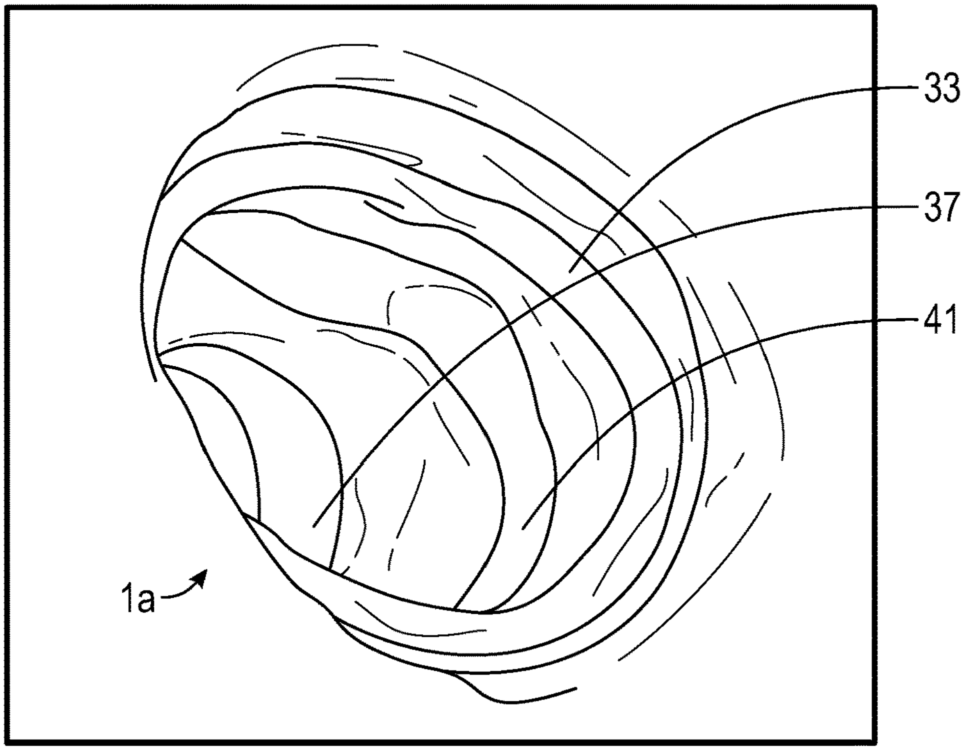

With reference to FIGS. 11A to 11C, using a long-shank, slow-speed custom "T" bur 35 in the water-cooled surgical handpiece 9, the apical portion of the root 37 is severed from the tooth ring 33. This is performed by positioning the "T" bur 35 at the base of the 7 mm deep coronal flaring, i.e. at the base of the lumen of the tooth ring 33 and by moving the bur into contact with and around the periphery of the internal wall of the tooth root to make a cut 41 through the internal wall of the tooth root 1*a*. The cut 41 defines a gap between the lower part of the tooth ring 33 and the upper part of the apical portion of the tooth root 37. The shank 39 needs to be kept hard against the walls to ensure maximum depth of cutting. The bur 35 may be 3 mm in diameter and 2.5 mm in height and is suitably configured for edge and top cutting only. The generally flat base of the opening in the coronal portion of the tooth root can be used as a guide for the base of the bur when cutting the peripheral opening.

Figure 12A:
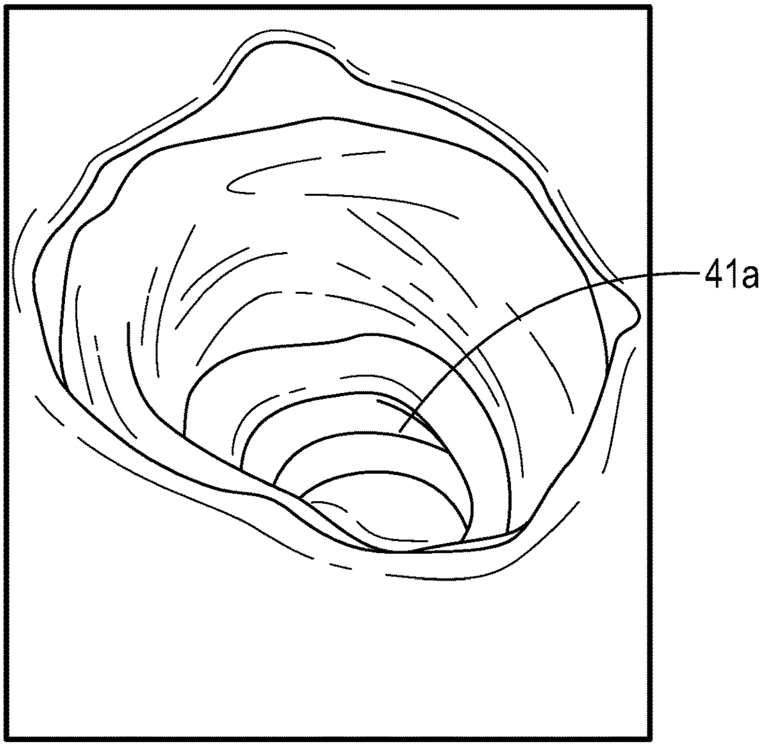
FIGS. 12A, 12B and 12C show a situation in which the "T" shaped bur has not cut through all the way around the periphery of the tooth ring.
Figure 12B:
Figure 12C:
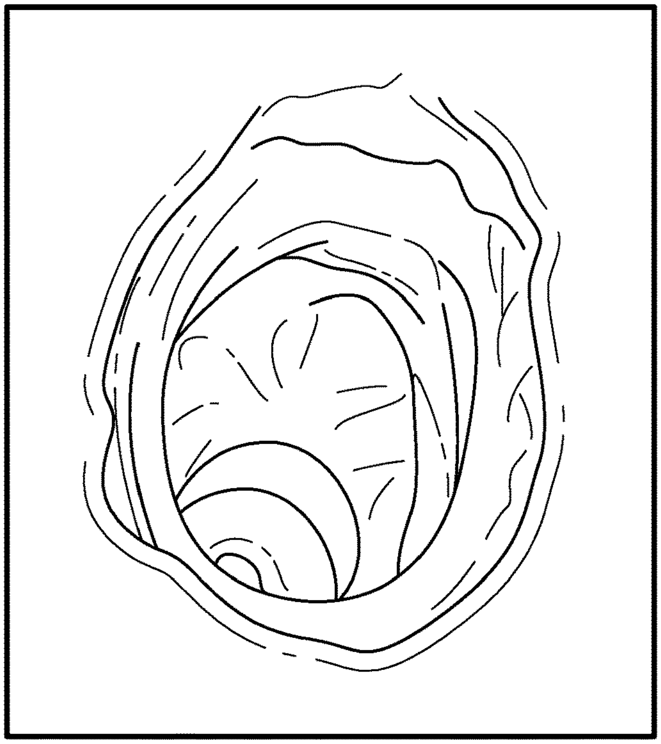

If the custom "T" bur does not completely sever the root 37, further reduction is required to reduce the thickness of the walls. A clean dissection is characterised by bleeding bone and an obvious difference in colour. In the situation illustrated in FIGS. 12A to 12C, the "trough" 41A from the cut-off bur is clearly visible, however no perforation of the root has occurred. In this situation, the custom "T" bur is dragged coronally up the root to reduce the thickness of the walls (see FIGS. 12B and 12C). Then the custom "T" bur is positioned at the base of 7 mm deep preparation and used in a centric motion to severe the root.

Figure 13A:
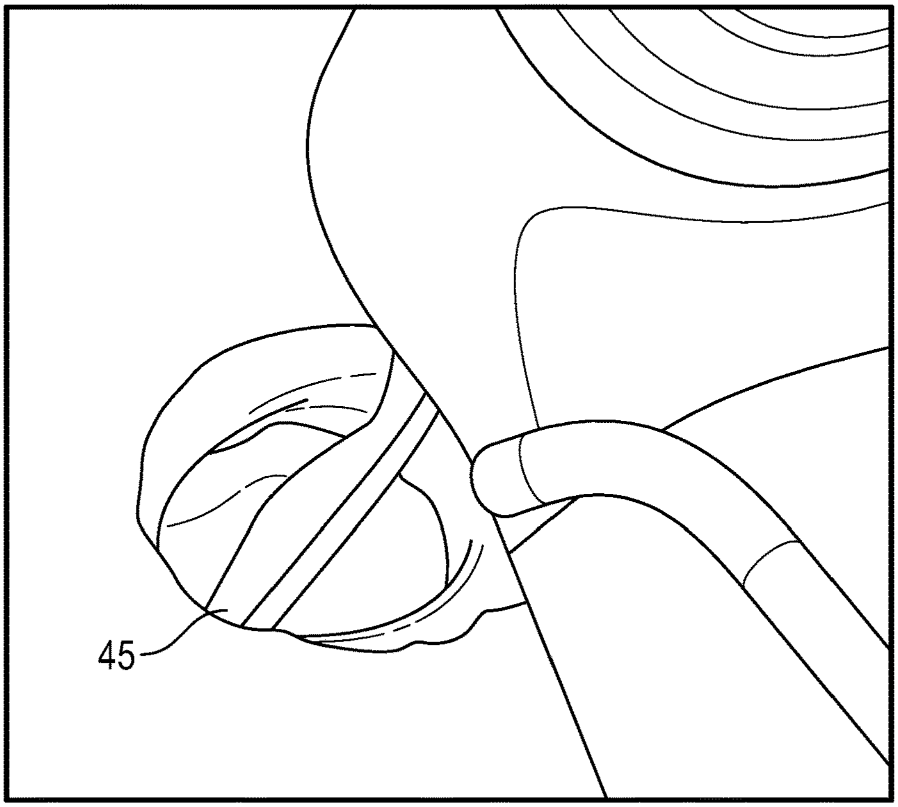
FIGS. 13A, 13A.1, and 13B illustrate the drilling of a hole in the severed apical tooth root.
Figure 13B:
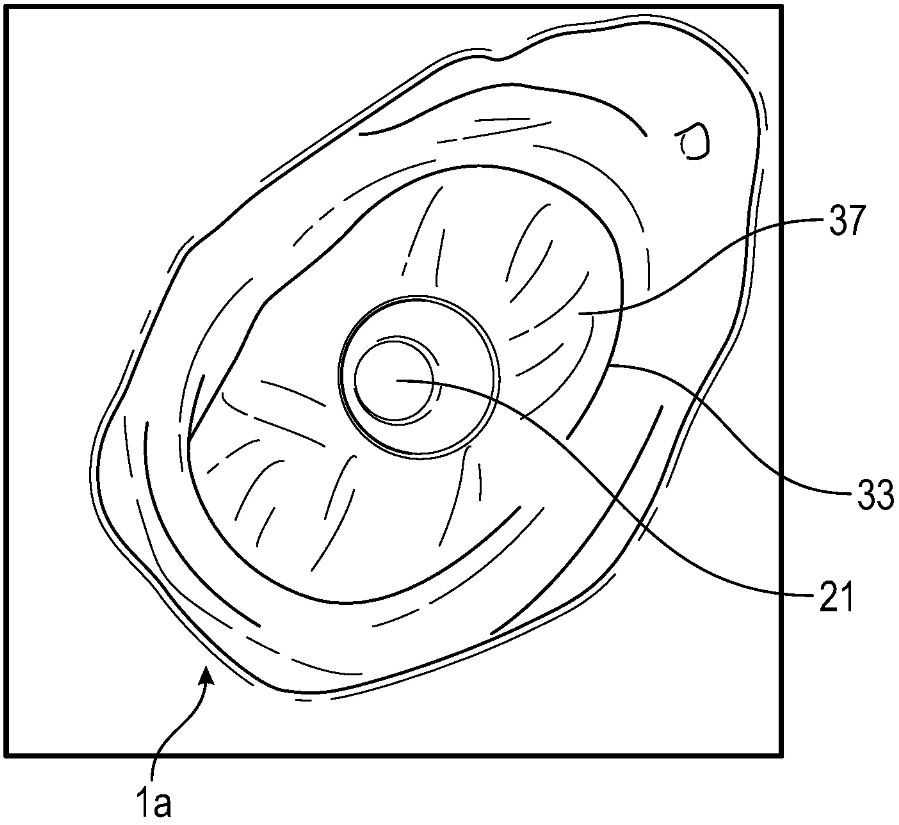

As shown in FIGS. 13A and 13B, a suitable drill bit 45 is then used to drill a hole in the severed root 37 by following the root canal 21. It is preferable to follow the root canal to avoid the risk of perforation. A depth of 5-7 mm is sufficient.

Figure 14A:
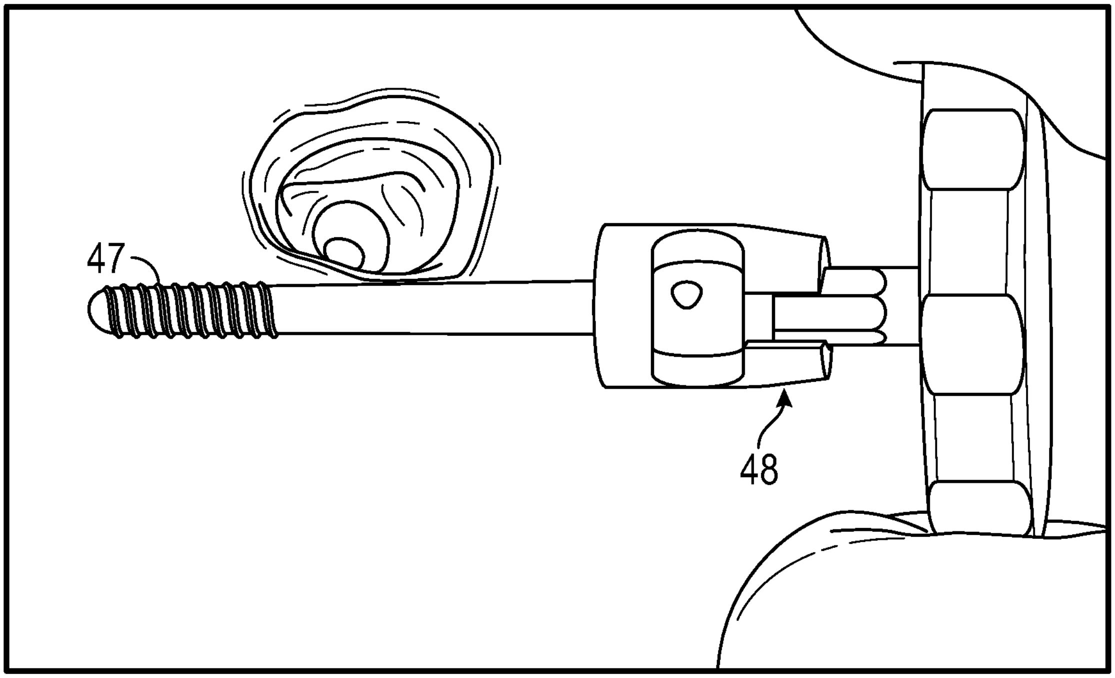
FIGS. 14A to 14C illustrate the insertion of a post into the severed apical tooth root.
Figure 14B:
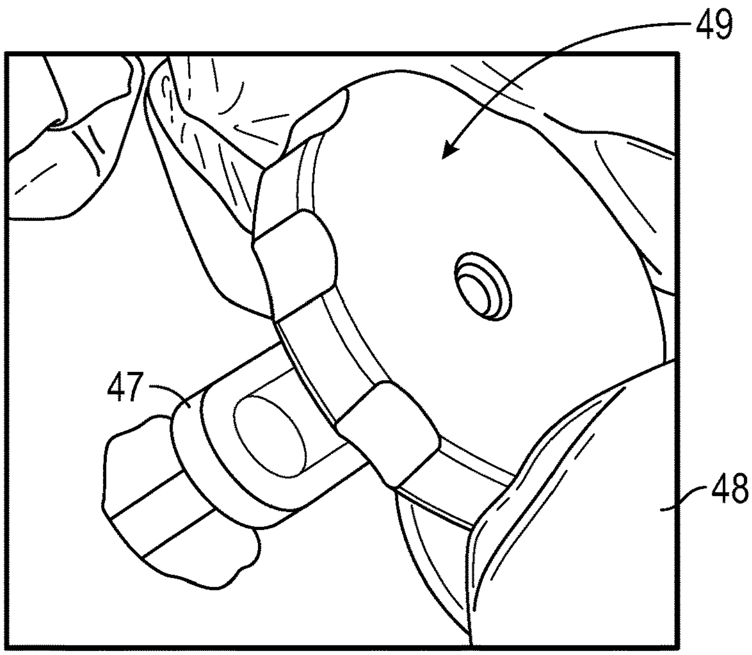
Figure 14C:
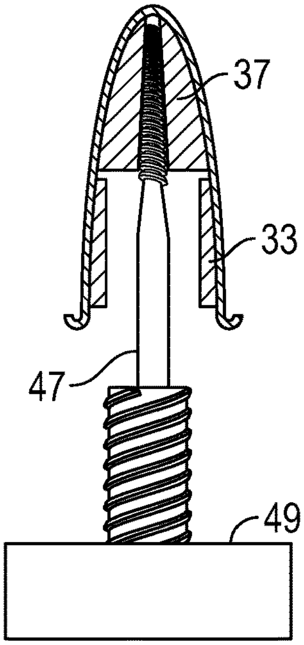
Figure 14C:
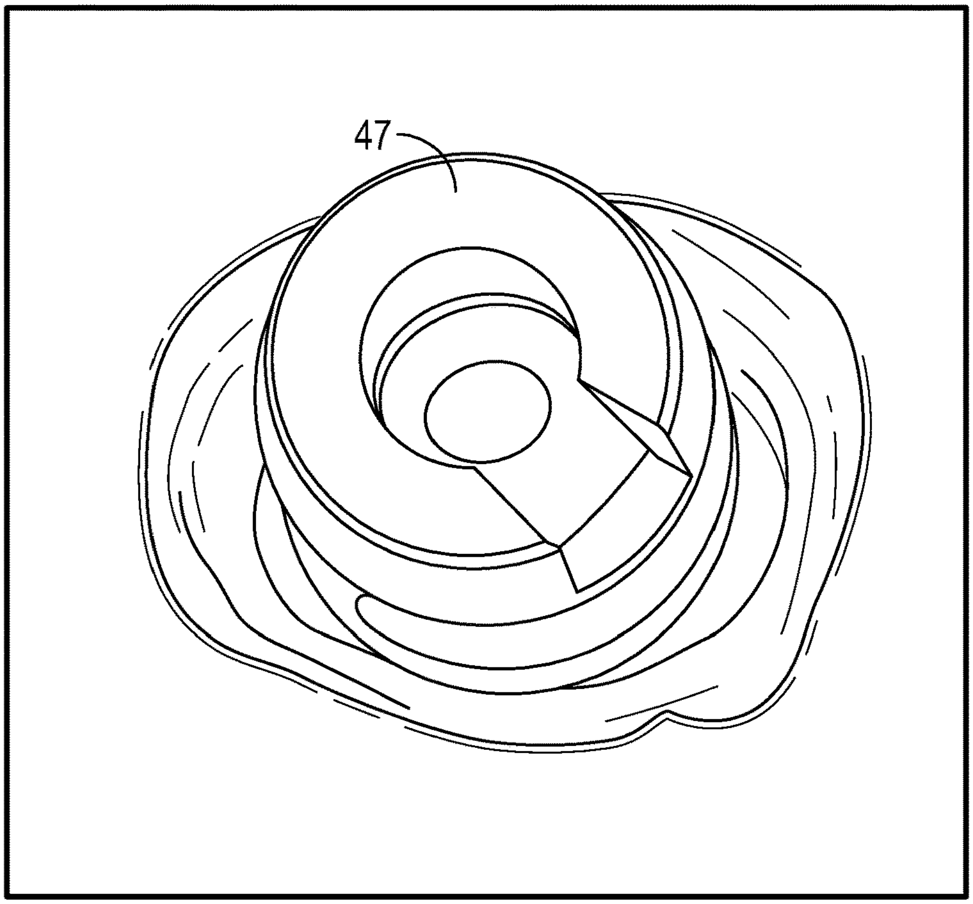

A suitable post 47 is then screwed into the severed root 37 by means of tool 48 as shown in FIGS. 14A-14C.

The post 47 is then connected to a Benex or similar root extraction mechanism 46, as illustrated in FIGS. 15A (which shows placement of a support tray over the gum), 15B and 15B.1, to thereby extract the apical portion of the root 37 from the underlying bone as shown in FIG. 15B.1.

Figure 16:
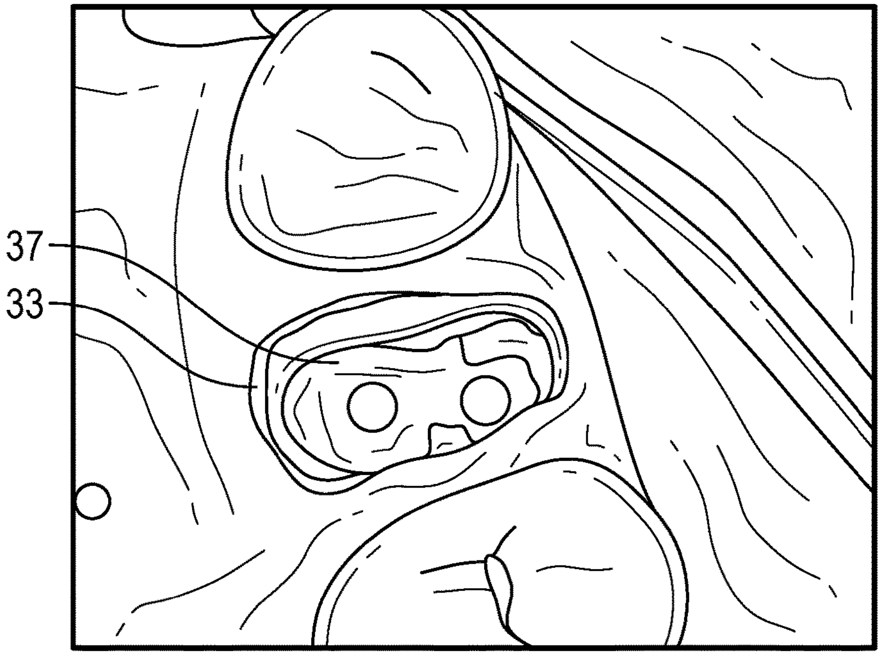
FIGS. 16 and 16.1 show a root detached from the bone subsequent to operation of the root extraction device and removal of the post.
Figure 17A:
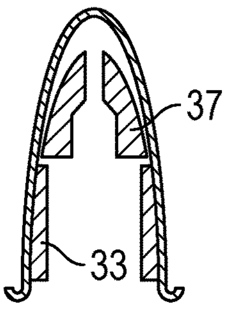
Figure 17A:
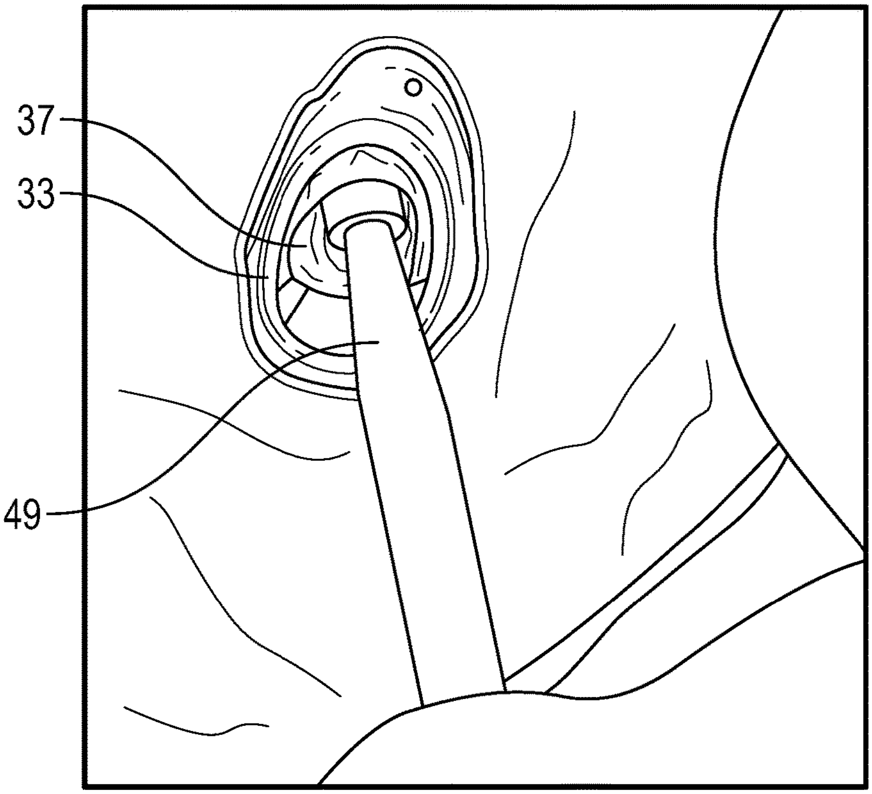

With reference to FIG. 16, the severed root 37 is then free to move up and down in a vertical motion. The post 47 is then removed by unscrewing it in an anti-clockwise direction. The severed root 37 will usually be too wide to pass through the lumen of the tooth ring 33, except in multi-rooted teeth. Therefore, as illustrated in FIGS. 17A and 17B, a surgical round bur on a high-torque, water-cooled surgical handpiece is then used to section the root into two pieces 49*a*, 49*b*. Alternatively and preferably, a piezo-electric cutting drill such as VS3-LED-HPSC, with a tip as illustrated in FIG. 17B.1, may be used to section the detached root. This is performed at the isthmus. The root pieces 49*a* and 49*b* can then be removed through the lumen of the tooth ring 33 by means of forceps 51 or any other suitable tool as illustrated in FIGS. 18 and 18.1. As a consequence, the tooth ring 33 is left intact and is approximately 4 mm±1 mm in height and 0.5-1 mm in wall thickness as illustrated in FIG. 19.

In one embodiment of the present invention an implant 53 (if required) is then inserted through the tooth ring 33. The implant may derive stability by contacting the inside wall of the shield. It is preferable that the implant crest 55 extends at or slightly below the base 34 of the tooth ring 33 so that unobstructed access to the internal surface of the implant 53 is preserved. FIGS. 20 and 20.1 show a clinical view of an implant within a tooth ring.

Although the Benex cable and pulley root extraction mechanism that has been described has been found satisfactory with anterior teeth, the Inventor has found that a smaller device, which can be more readily manoeuvred in relation to the back teeth, would be preferable.

Figure 21:
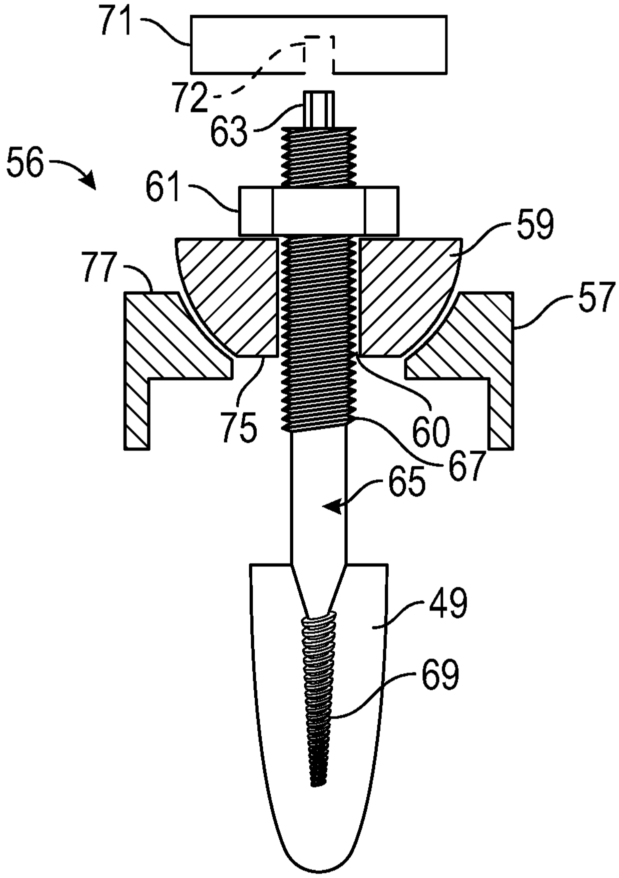
FIG. 21 depicts a root extraction instrument according to a preferred embodiment of an aspect of the present invention.
Figure 22:
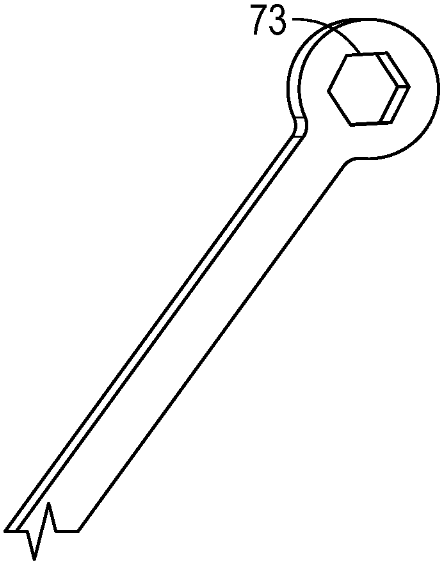
FIG. 22 depicts a wrench for operating an operative member in the form of a nut of the root extraction instrument of FIG. 21.

Referring now to FIG. 21 there is depicted a root withdrawal apparatus 56 according to an embodiment of an aspect of the present invention. Apparatus 56 includes a platform in the form of a tray 57 that locates over the gum and which has a central opening 75 with arcuate sides 77 that supports a corresponding hemispherical swivel 59 having a central bore 60 formed therethrough.

A lead screw 65 is provided having a threaded portion 67 that passes through the central bore 60 and which is captured by an operative member in the form of a nut 61. The threaded portion 67 terminates in a hexagonal coupling protrusion 63 that is received into a complementary recess 72 of a rotary handle 71.

An inner end of the lead screw 65 terminates in a threaded point 69 that in use is screwed into a canal of a tooth root 49 by rotation of the handle 71. Once the threaded point 69 has been sufficiently screwed into the root 49 the handle 71 is removed. A spanner 73 is then placed over the nut 61 and used to rotate the nut 61 relative to the threaded portion 67 of the lead screw 65. The action of tightening the nut 61 causes its lower face to self-align with the upper surface of hemispherical swivel 59 in the hemispherical tray 57. This results in no bending moment being applied to lead screw 65. Thus, the lead screw 65 is translated away from the bone to which the root 49 is attached so that the root 49 is extracted from the underlying bone.

In the embodiment shown in FIG. 21, the nut 61 rests directly on the hemispherical swivel 59. When the nut 61 is rotated to withdraw the lead screw 65, as the nut 61 is in contact with the hemispherical swivel 59, there is a risk that a rotational movement will be applied to the hemispherical swivel 59 or to the lead screw 65. In order to minimise or avoid rotation of the hemispherical swivel 59 or the lead screw 65, a thrust bearing (not shown) may be placed between the nut 61 and the hemispherical swivel 59. Rotation of the nut will then cause rotation of the thrust bearing, but there will be no rotation of the surface of the thrust bearing that is in contact with the hemispherical swivel 59.

Figure 23:
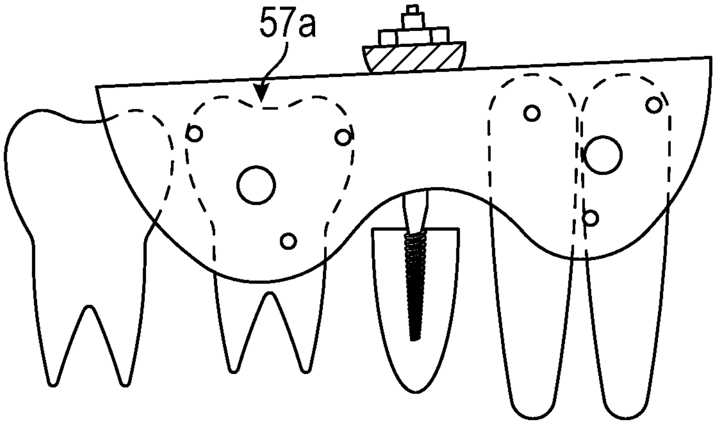
FIG. 23 depicts a platform or "tray" of a root extraction instrument according to a further embodiment of the present invention.
Figure 24:
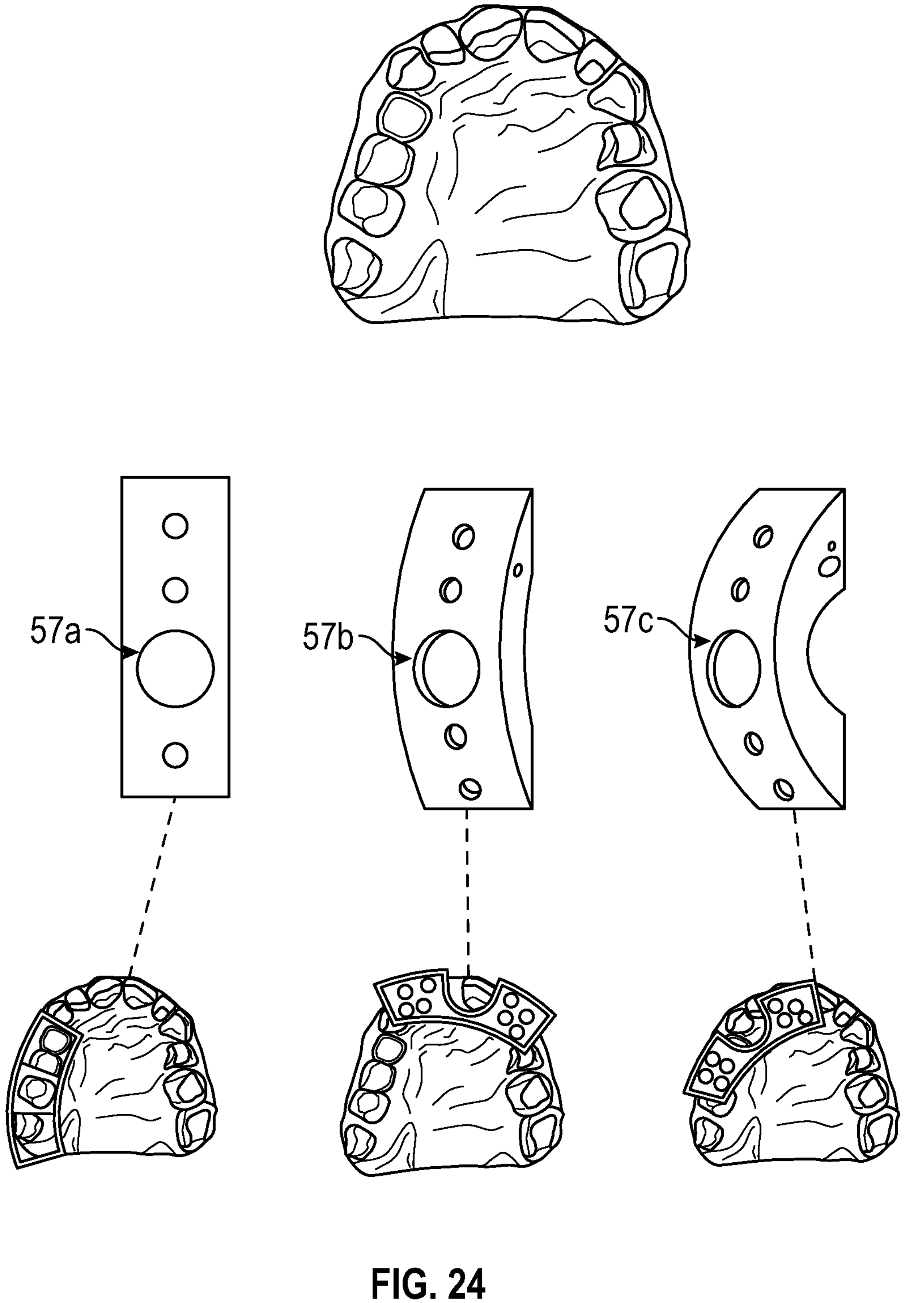
FIG. 24 depicts further trays for use of the tooth extraction instrument on anterior, posterior and canine teeth.
Figure 25:
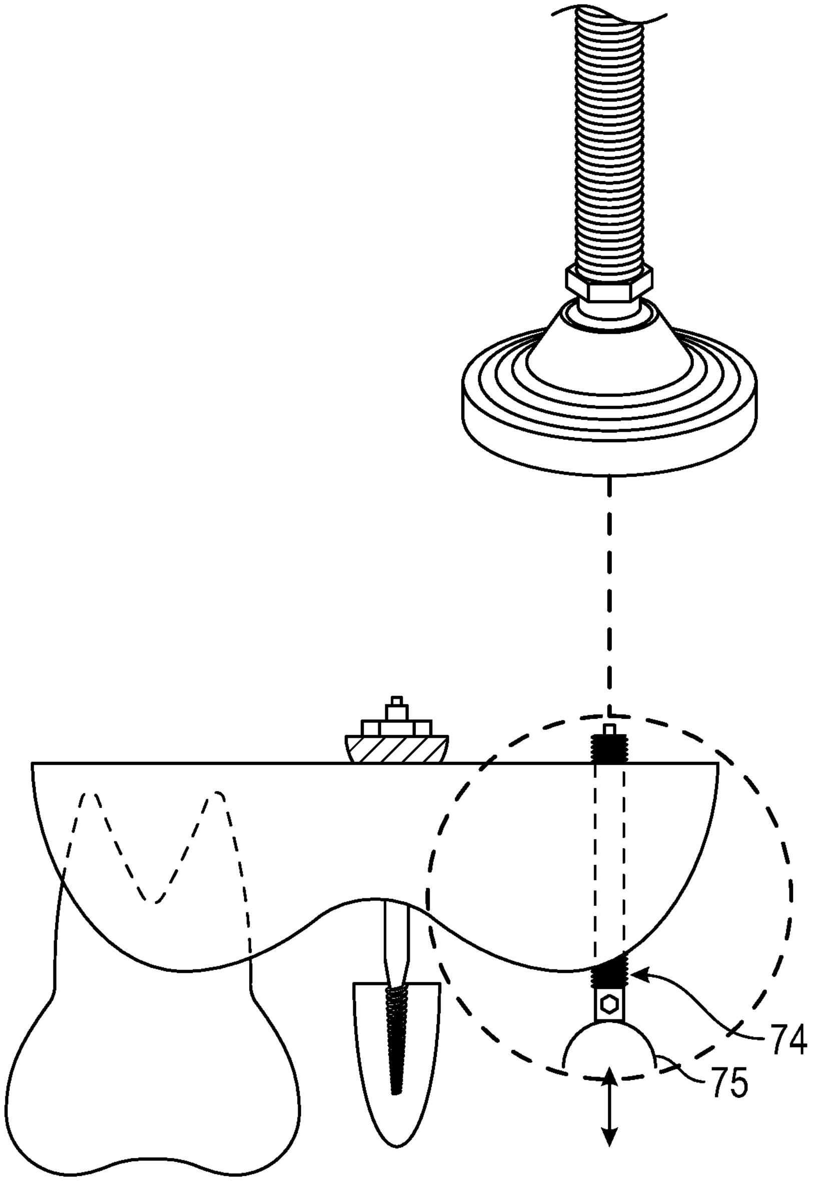
FIG. 25 illustrates a further embodiment of the root extraction instrument including a height adjustable post.
Figure 27:
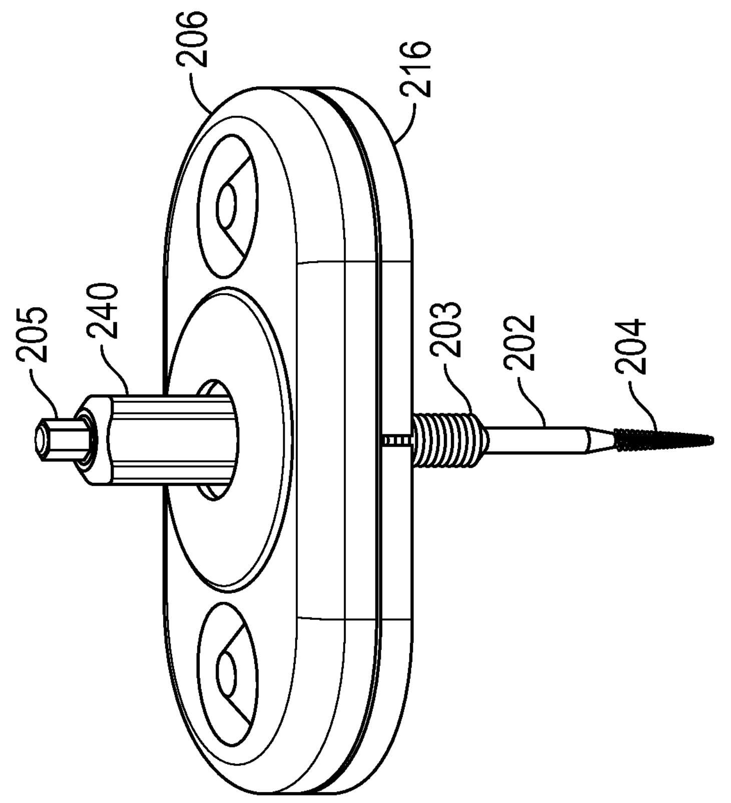
FIG. 27 shows a perspective view of the assembled device shown in FIG. 26.

Tray 57 may be provided in various configurations to accommodate different positions in the mouth. For example, FIG. 23 depicts a platform 57*a* that is designed to be used with molar teeth. FIG. 24 illustrates trays 57*a*, 57*b* and 57*c*, each having different shapes that are for use with posterior, anterior and canine teeth of the patient. FIG. 25 illustrates how a post 74 with an adjustable foot 75 may be provided to assist in supporting the tray where it is partially positioned over a toothless area of gum.

FIGS. 26 to 32 show various views of a device in accordance with another embodiment of the present invention for detaching a tooth root. The device 200 comprises a lead screw 202. The lead screw 202 includes a threaded point 204 that has a threaded region extending up the shaft from the point. The threaded portion 204 at the point of the lead screw 202 enables the threaded point of the lead screw to be screwed into a tooth root. This is common in a number of dental instruments and need not be described further, except to say that a number of different thread designs and tapers may be used. The upper end of the lead screw 202 may have an engagement region 205 at which a turning tool, such as a hand wheel, can engage with the screw to thereby enable the surgeon to rotate the screw. The lead screw 202 also includes a threaded region 203 on the shank of the lead screw 202.

The device comprises a platform 206. The platform 206 is made from a rigid material, such as stainless steel or a rigid plastic. The platform 206 includes a curved recess 208 having an opening 210 in a lower part thereof. The platform 206 also includes further openings 212, 214 that receive protruding lugs on a cushion member to thereby enable a cushion member 216 to be removably attached to the platform 206. The protruding lugs 218, 220 on the cushion member 216 can be partially seen in FIG. 26. It will be appreciated that the protruding lugs 218, 220 may be pressed through respective openings 212, 214 to thereby retain the cushion member in position relative to the platform 206. The protruding lugs 218, 220 may have oversized heads that become compressed as they are moved through the openings 212, 214 in the platform 206. Once the heads have passed through the openings, they can snap back to their normal size to thereby retain the cushion in position. The cushion may be made from two separate cushion parts, as can be best seen in FIG. 26

The device is also provided with a swivel member. The swivel member comprises an upper member 222 in the form of a body having an opening or passage 223 passing through the body. The opening 223 has a threaded region 224 at its lower end. The upper member 222 has a curved outer surface 226 that is generally complementary in shape to the curved recess 208 of platform 206. The swivel member also includes a lower member 228. Lower member 228 has a lower curved surface 230. The lower member 228 also includes a bore 232 that has a diameter that is somewhat larger than the outer diameter of the lead screw 202. A threaded region 234 enables the lower member 228 to be screwed into the complementary threaded region 224 in the lower part of the opening 223 in the upper member 222. In this manner, the lower member 228 can be connected to the upper member 222 to assemble the swivel member 229.

Figure 32:
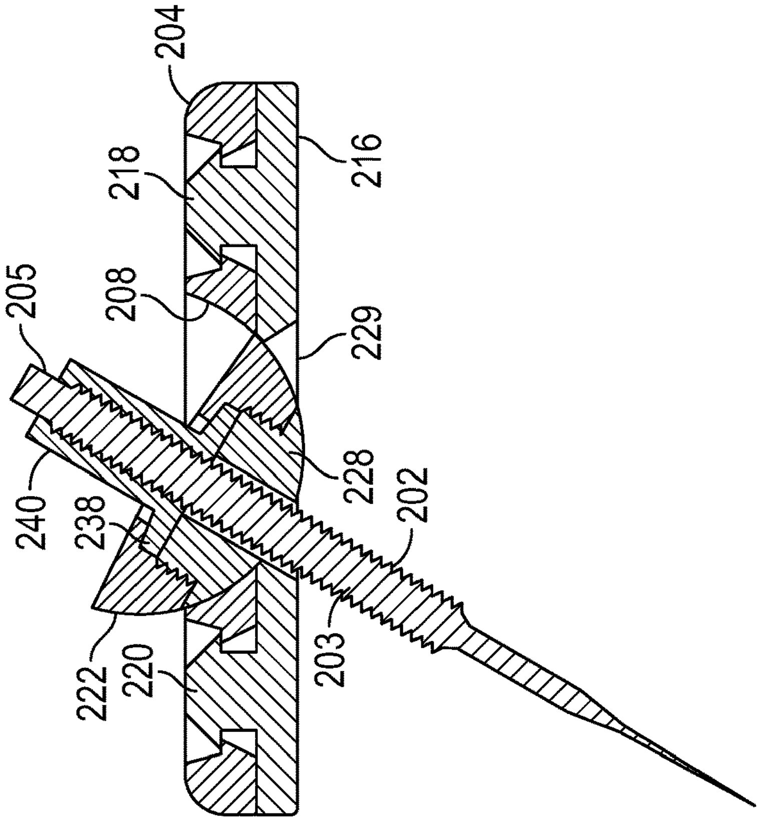
FIG. 32 is a cross sectional view taken along section J-J shown in FIG. 31.

Prior to connecting the lower member 228 to the upper member 222, a threaded nut 236 is positioned between the lower member 228 and the upper member 222. This results in the threaded nut 236 being captured between the lower member 228 and the upper member 222. The threaded nut 236 includes a flange 238 that is positioned between a shoulder extending around the upper part of the opening 223 in the upper member 222 and an upper surface of the threaded portion of the lower member 228. This is best shown in FIG. 32. In this manner, the threaded nut 236 can rotate relative to the swivel member, but it is retained within the swivel member.

Figure 26:
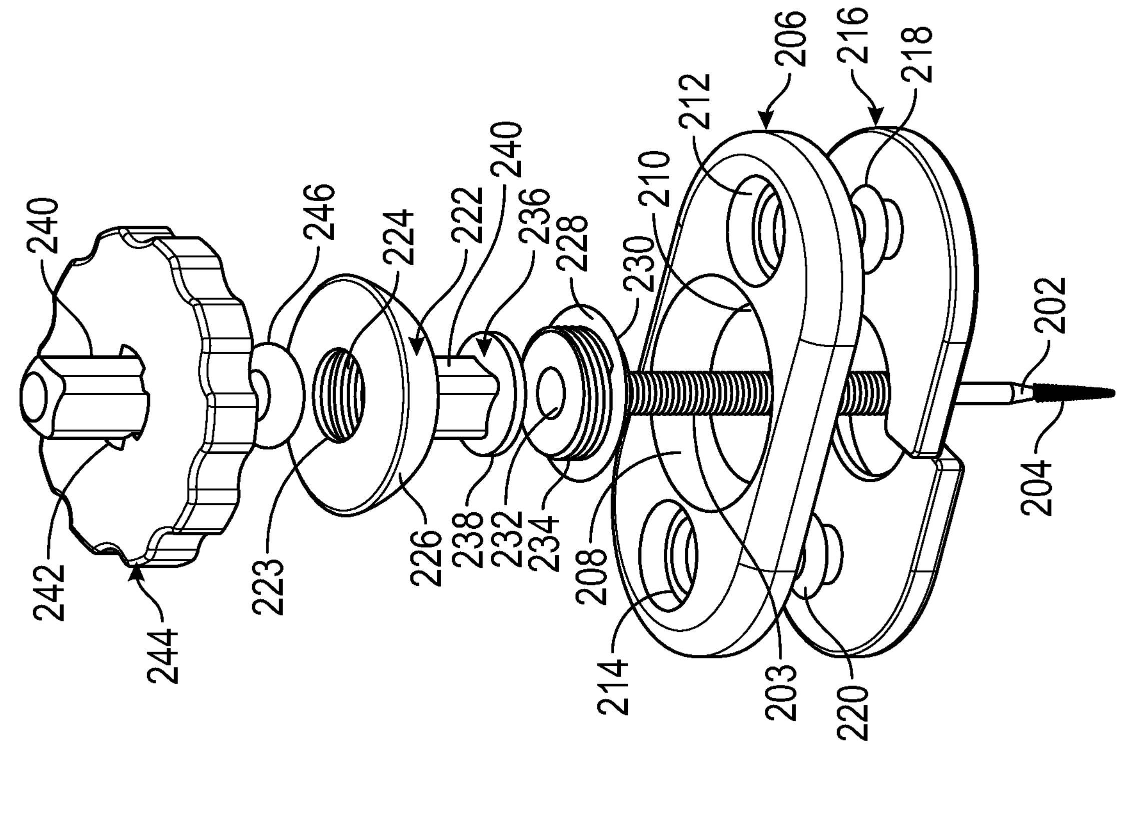
FIG. 26 shows an exploded view of a device in accordance with another embodiment of the present invention for detaching a tooth root.
Figure 28:
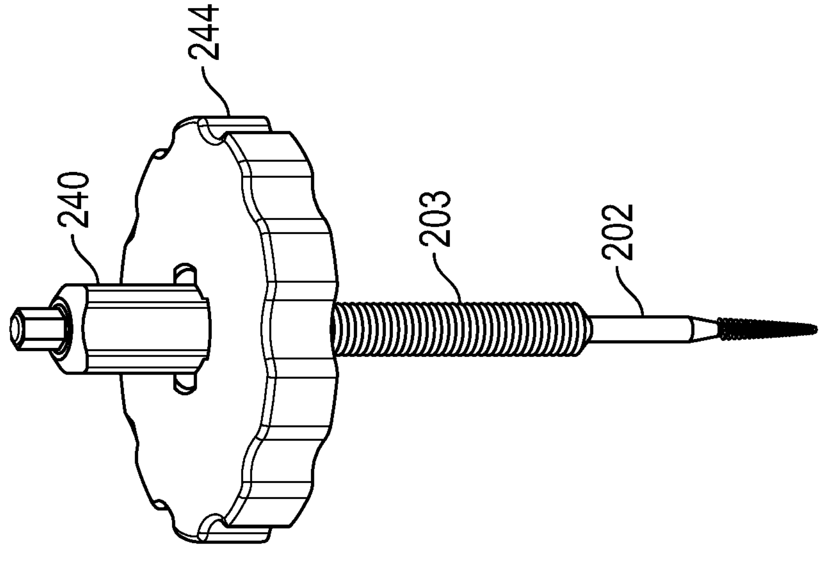
FIG. 28 shows a perspective view of the lead screw and nut having a handwheel placed over the nut to enable the nut to be rotated by the surgeon.
Figure 29:
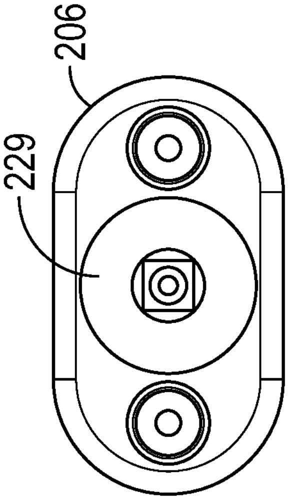
FIG. 29 is a top view of the device shown in FIG. 27.
Figure 30:
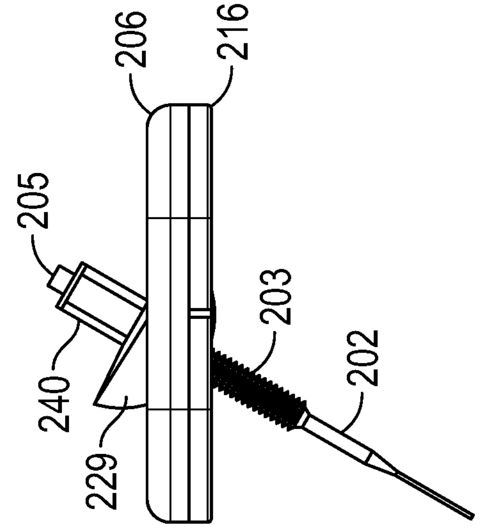
FIG. 30 is a front view of the device shown in FIG. 29.
Figure 31:
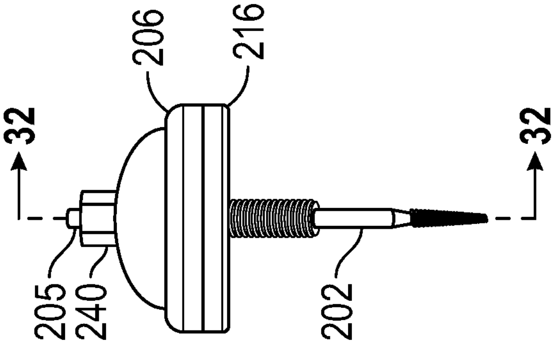
FIG. 31 is a side view of the device shown in FIG. 30.

The threaded nut 236 is provided with an outer engagement surface 240 that can engage with a rotating tool, such as a hand wheel or a spanner, to thereby enable the threaded nut 236 to be rotated by the surgeon. FIGS. 26 to 32 show this region as a square head region. However, other shaped regions, such as hexagonal shaped regions, may also be used. Further, other types of engagement services, such as slots or openings for screwdriver heads or Allen keys or sockets may also be used. In FIG. 26, the outer engagement surface 240 has also been drawn as extending through a central opening 242 of a turning wheel 244. It will be appreciated that other tools may also engage with the outer engagement surface 240 of the threaded nut 236. The turning wheel 244 also has an O-ring 246 to assist in seating the turning wheel 244 on the threaded nut 236.

As best shown in FIG. 32, when the upper member 222 and the lower member 228 are connected together, a swivel member 229 is formed, the swivel member 229 having a curved outer surface. Suitably, the outer surface of the swivel member 229 is generally hemispherical in shape. The curved recess 208 of the platform is also suitably generally hemispherical in shape. In this manner, the swivel member 229 can swivel relative to the curved recess 208.

Figure 33:
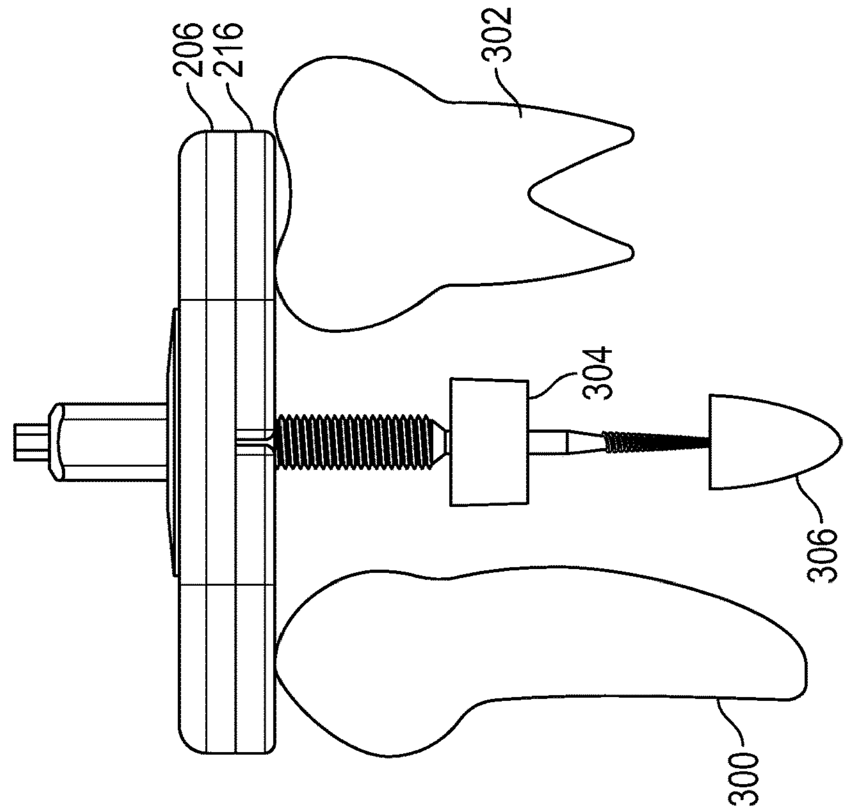
FIG. 33 is a schematic diagram showing the device of FIGS. 26 to 32 in use.

Operation of the device shown in FIGS. 26 to 32 is generally similar to operation of the device shown in FIGS. 21 to 23 and FIG. 33 shows a schematic view of the device in use. In this regard, the cushion 216 is attached to the platform 206 and the platform is placed on the teeth of the patient surrounding the site of the operation. In particular, the platform 206 and cushion 216 are placed on the teeth 300, 302 that are located on either side of the site of the operation. FIG. 33 also schematically shows the tooth ring 304 and the apices of the tooth root 306 (although the space between the tooth ring 304 and the tooth root 306 in FIG. 33 are shown at an exaggerated scale). The lead screw 202 is screwed into the threaded nut 236 such that the threaded region 203 of the lead screw 202 engages with the internal threads on the threaded nut 236. The swivel member with the lead screw threadably engaged therewith is placed into the curved recess on the platform 206. The lead screw 202 is rotated to extend downwardly through the threaded nut 236 and through the tooth ring 304 until the threaded point 204 engages with the tooth root 306, with the threaded point 204 being screwed into the tooth root 306 to thereby effectively attach the lead screw 202 to the tooth root 306. Once that has occurred, the turning wheel 244 is then placed over the engagement region 240 of the threaded nut 236. The turning wheel is then operated by the surgeon to turn the threaded nut 236. As the lead screw 202 is effectively secured to the tooth root 306, the lead screw is prevented from rotating with the threaded nut 236. Consequently, rotation of the threaded nut 236 causes retraction of the lead screw, which also results in the tooth root 306 becoming detached from the gum/bone. Consequently, the tooth root is loosened and partially removed.

As the lead screw can swivel relative to the platform, the lead screw can self-align whilst the lead screw is being retracted to detach the tooth root. As a result, no bending moment is applied to the lead screw, which assists in ensuring satisfactory detachment of the tooth root from the underlying bone to which it is attached. Furthermore, this novel feature reduces the risk of the lead screw bending or breaking.

The Inventor believes that the extraction tool may be made sufficiently compact to be used in relation to posterior teeth where line and pulley extraction tools such as the Benex may be difficult to utilise.

The Inventor has found that embodiments of the previously described method for placement of dental implants may be practiced quickly so that the time that the patient is subjected to the procedure is relatively brief. Furthermore, the step of making the tooth ring and then subsequently withdrawing the extracted root through the ring addresses the difficulties that have been previously described in relation to the Socket Shield and Pontic Shield technique. Namely, it is not necessary to lever sectioned tooth from the bone and the difficulty of leaving a buccal root segment is avoided.

The present inventor believes that leaving the tooth ring in the gum socket will reduce or prevent alveolar resorption over time. In particular, the tooth ring provides a ring of natural tooth material in the gum socket. This reinforces the coronal part of the gum socket. Further, resorption is likely to be minimised as the tooth material is a natural material of the body.

Embodiments of the present invention also involve significantly less trauma to the gum socket then the "Socket Shield" technique. This results in less pain and discomfort to the patient and to a quicker recovery time from surgery.

In compliance with the statute, the invention has been described in language more or less specific to structural or methodical features. The term "comprises" and its variations, such as "comprising" and "comprised of" are used throughout in an inclusive sense and not to the exclusion of any additional features. It is to be understood that the invention is not limited to specific features shown or described since the means herein described comprises preferred forms of putting the invention into effect. The invention is, therefore, claimed in any of its forms or modifications within the proper scope of the appended claims appropriately interpreted by those skilled in the art.

Throughout the specification and claims (if present), unless the context requires otherwise, the term "substantially" or "about" will be understood to not be limited to the value for the range qualified by the terms.

Any embodiment of the invention is meant to be illustrative only and is not meant to be limiting to the invention. Therefore, it should be appreciated that various other changes and modifications can be made to any embodiment described without departing from the spirit and scope of the invention.

The invention claimed is:

1. A dental surgical method for a tooth, the dental surgical method comprising:
 decoronating the tooth to leave a tooth root;
 decoring a coronal portion of the tooth root to leave a decoronated tooth root portion;
 serving an apical root portion from the decoronated tooth root portion to leave a ring-shaped portion of the tooth root and a gap between a lower end of the ring-shaped portion of the tooth root and an upper end of the apical root portion; and
 removing the apical root portion through a lumen at a center of the ring-shaped portion of the tooth root.

2. The dental surgical method of claim 1, comprising fixing an implant through the ring-shaped portion of the tooth root into a bone for a dental implant crown procedure.

3. The dental surgical method of claim 1, wherein the decoronating the tooth comprises cutting into a side of the tooth with a cutting tool and then levering a crown off to form the decoronated tooth root portion.

4. The dental surgical method of claim 3, wherein the cutting into the side of the tooth with the cutting tool is performed above a gum line adjacent to the tooth.

5. The dental surgical method of claim 4, wherein the tooth root is reduced at least 2 mm below the gum line.

6. The dental surgical method of claim 1, comprising applying a tool to the tooth root to reduce it below a gum line following decoronating of the tooth.

7. The dental surgical method of claim 1, wherein the decoring of the coronal portion of the tooth root to leave the decoronated tooth root portion includes enlarging the coronal portion of a root canal of the tooth root.

8. The dental surgical method of claim 7, wherein the enlarging comprises sequential use of progressively larger Gates-Glidden drills to enlarge the root canal.

9. The dental surgical method of claim 8, wherein progressively larger drills are used subsequent to use of the Gates-Glidden drills to further enlarge the root canal.

10. The dental surgical method of claim 1, further comprising using a bur to enlarge the coronal portion of the tooth root following the removal of the apical root portion to thereby leave the ring-shaped portion of the tooth root.

11. The dental surgical method of claim 1, wherein the ring-shaped portion of the tooth root has a wall thickness of between 0.5 mm to 1.0 mm.

12. The dental surgical method of claim 1, wherein the severing of the apical root portion from the decoronated tooth root portion includes making a peripheral opening through a base of a coronal hole.

13. The dental surgical method of claim 12, wherein the peripheral opening is made with a bur having a "T" profile; and wherein edges of a cross bar of the "T" profile are formed to cut tooth material.

14. The dental surgical method of claim 1, wherein the removing of the apical root portion comprises loosening the apical root portion following severing of the apical root portion.

15. The dental surgical method of claim 14, wherein the loosening of the apical root portion comprises drilling a hole in the apical root portion and affixing an anchor therein.

16. The dental surgical method of claim 15, further comprising coupling the anchor to an extraction mechanism whereby operation of the extraction mechanism causes the anchor to tension the apical root portion to thereby detach it from a bone.

17. The dental surgical method of claim 16, wherein the extraction mechanism comprises one of a line and pulley tool and a swiveling screw jack.

18. The dental surgical method of claim 1, wherein the removing of the apical root portion comprises withdrawing sections through the lumen at the center of the ring-shaped portion of the tooth root, sectioning the apical root portion and withdrawing sections of the apical root portion through the lumen at the center of the ring-shaped portion of the tooth root.

19. The dental surgical method of claim 1, further comprising fixing an implant through the ring-shaped portion of the tooth root into a bone to thereby facilitate a dental implant crown procedure; and wherein the fixing of the implant through the ring-shaped portion of the tooth root into the bone includes positioning a crest adjacent to the ring-shaped portion of the tooth root to provide unobstructed access to an internal surface of the implant.

20. The dental surgical method of claim 1, wherein the ring-shaped portion of the tooth root is left submerged in a gum to preserve an alveolar ridge.

* * * * *